United States Patent
Chiba et al.

(10) Patent No.: US 8,675,979 B2
(45) Date of Patent: Mar. 18, 2014

(54) TRANSCODER, METHOD OF TRANSCODING, AND DIGITAL RECORDER

(75) Inventors: Takuma Chiba, Osaka (JP); Kenjiro Tsuda, Osaka (JP); Tatsuro Juri, Osaka (JP); Yuki Kobayashi, Osaka (JP); Takashi Masuno, Osaka (JP); Katsuo Saigo, Hyogo (JP); Yukinaga Seki, Kyoto (JP); Hiroaki Shimazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 12/937,563

(22) PCT Filed: Dec. 11, 2009

(86) PCT No.: PCT/JP2009/006818
§ 371 (c)(1),
(2), (4) Date: Oct. 13, 2010

(87) PCT Pub. No.: WO2010/067624
PCT Pub. Date: Jun. 17, 2010

(65) Prior Publication Data
US 2011/0032988 A1    Feb. 10, 2011

(30) Foreign Application Priority Data
Dec. 12, 2008    (JP) .................................. 2008-316362

(51) Int. Cl.
*G06K 9/46*    (2006.01)

(52) U.S. Cl.
USPC ...................................... 382/239; 375/240.12

(58) Field of Classification Search
None
See application file for complete search history.

(56) References Cited

U.S. PATENT DOCUMENTS

| | | | |
|---|---|---|---|
| 2005/0069211 A1* | 3/2005 | Lee et al. ...................... | 382/239 |
| 2005/0276493 A1 | 12/2005 | Xin et al. | |
| 2006/0039473 A1 | 2/2006 | Filippini et al. | |
| 2006/0190625 A1* | 8/2006 | Chung ........................... | 709/247 |
| 2006/0209948 A1* | 9/2006 | Bialkowski et al. ........ | 375/240.2 |
| 2007/0036218 A1 | 2/2007 | Burazerovic | |
| 2007/0071096 A1 | 3/2007 | Chen et al. | |

FOREIGN PATENT DOCUMENTS

| | | |
|---|---|---|
| JP | 2006-295598 | 10/2006 |
| JP | 2006-295734 | 10/2006 |
| JP | 2008-124699 | 5/2008 |

OTHER PUBLICATIONS

International Search Report issued Mar. 9, 2010 in International (PCT) Application No. PCT/JP2009/006818.

* cited by examiner

*Primary Examiner* — Sath V Perungavoor
*Assistant Examiner* — Dakshesh Parikh
(74) *Attorney, Agent, or Firm* — Wenderoth, Lind & Ponack, L.L.P.

(57) ABSTRACT

A transcoder reduces the processing amount when a coded stream to which at least intra prediction is applied is transcoded into a coded stream to which intra prediction and inter prediction are applied. The transcoder converts a first coded stream to at least part of which intra prediction is applied, into a second coded stream to which intra prediction and inter prediction are applied. The transcoder includes a decoding unit that decodes the first coded stream to generate decoded image data; a prediction mode obtaining unit that obtains a prediction mode of intra prediction applied in decoding; and a coding unit that codes the decoded image data by applying the intra prediction or inter prediction to generate the second coded stream. A control unit controls causes the coding unit to use the prediction mode obtained by the prediction mode obtaining unit when the coding unit applies intra prediction.

9 Claims, 18 Drawing Sheets

FIG. 5

| Sub-block number | Prediction mode |
|---|---|
| 0 | Mode 0 |
| 1 | Mode 0 |
| 2 | Mode 1 |
| 3 | Mode 3 |
| 4 | Mode 1 |
| 5 | Mode 1 |
| 6 | Mode 5 |
| 7 | Mode 7 |
| 8 | Mode 3 |
| 9 | Mode 1 |
| 10 | Mode 5 |
| 11 | Mode 1 |
| 12 | Mode 1 |
| 13 | Mode 3 |
| 14 | Mode 4 |
| 15 | Mode 1 |

FIG. 10
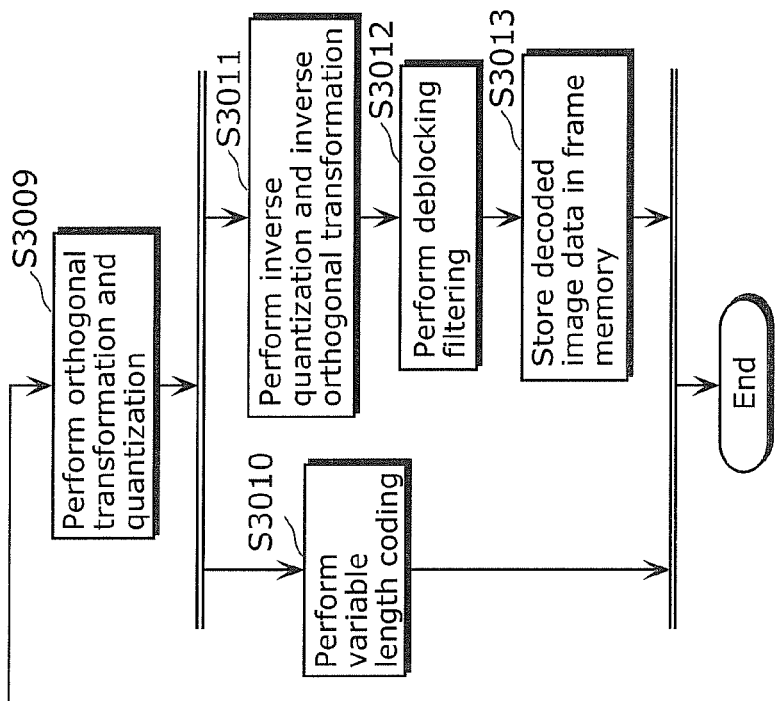
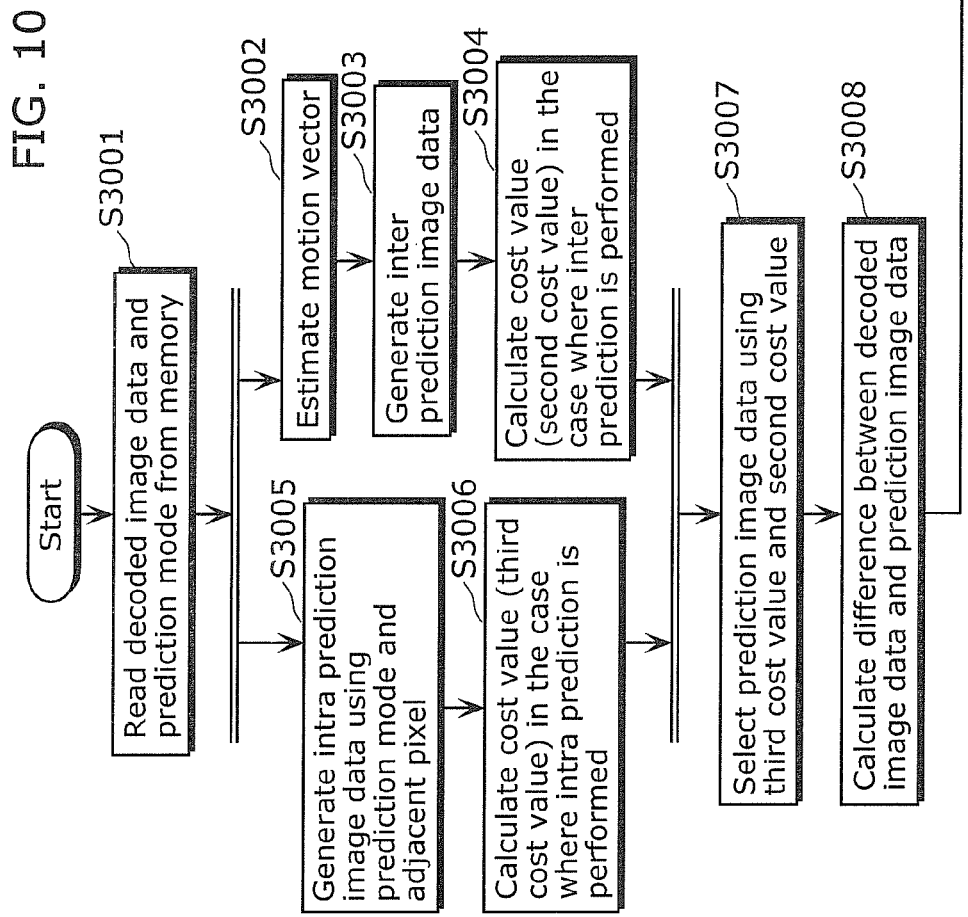

FIG. 14

| Sub-block number | Prediction mode | First cost value |
|---|---|---|
| 0 | Mode 0 | c0 |
| 1 | Mode 0 | c1 |
| 2 | Mode 1 | c2 |
| 3 | Mode 3 | c3 |
| 4 | Mode 1 | c4 |
| 5 | Mode 1 | c5 |
| 6 | Mode 5 | c6 |
| 7 | Mode 7 | c7 |
| 8 | Mode 3 | c8 |
| 9 | Mode 1 | c9 |
| 10 | Mode 5 | c10 |
| 11 | Mode 1 | c11 |
| 12 | Mode 1 | c12 |
| 13 | Mode 3 | c13 |
| 14 | Mode 4 | c14 |
| 15 | Mode 1 | c15 |

TRANSCODER, METHOD OF TRANSCODING, AND DIGITAL RECORDER

BACKGROUND OF THE INVENTION

1. Technical Field

The present invention relates to transcoding of coded data related to a moving picture, and in particular to transcoding of coded data coded in accordance with H.264/AVC coding standard.

2. Background Art

Along with the widespread use of H.264/AVC coding standard, transcoding from MPEG-2 to H.264/AVC has commonly been carried out for the purpose of long-duration recording, on a recorder or the like, of a digital broadcasting program coded in MPEG-2.

In transcoding, however, a coded stream coded in MPEG-2 is decoded to generate decoded image data, and the decoded image data that has been generated is recoded according to H.264/AVC coding standard. While the method above is reliable, there is a problem that the method involves a large processing amount because two processing, that is, decoding and coding need to be performed.

In order to address the problem, a method is disclosed that, when transcoding coded data coded in MPEG-2, a motion vector in the coded data is reused to reduce the processing amount required for recoding (see PLT1, for example).

CITATION LIST

Patent Literature

[PTL 1]
  Japanese Unexamined Patent Application Publication No. 2006-295734

SUMMARY OF INVENTION

Technical Problem

The above-described conventional technique, however, has a problem that the processing amount cannot be reduced when transcoding a coded stream to which intra prediction is applied.

Since the conventional technique disclosed by PLT 1 is a technique that utilizes a motion vector, it can be used only when performing transcoding from inter picture coding to inter picture coding. For that reason, it cannot be applied to transcoding from a coding system using the intra prediction such as H.264/AVC coding standard to a coding system using intra prediction and inter prediction.

An object of the present invention is, therefore, to provide a transcoder and method of transcoding that can reduce processing amount when transcoding a coded stream to which at least intra prediction is applied, into a coded stream to which intra prediction and inter prediction are applied.

In order to achieve the object described above, a transcoder according to an aspect of the present invention is a transcoder which converts a first coded stream to at least part of which intra prediction is applied, into a second coded stream to which intra prediction and inter prediction are applied, the transcoder including: a decoding unit configured to decode the first coded stream on a per predetermined unit basis to generate decoded image data; a prediction mode obtaining unit configured to obtain a prediction mode of intra prediction applied when the decoding unit decodes the first coded stream; a coding unit configured to code the decoded image data by applying intra prediction or inter prediction on the per predetermined unit basis to generate the second coded stream; and a control unit configured to control the coding unit so that the coding unit uses the prediction mode obtained by the prediction mode obtaining unit, when the coding unit applies intra prediction.

This configuration eliminates the need to perform processing for determining a prediction mode of intra prediction in the coding unit, by obtaining a prediction mode of intra prediction applied when decoding a coded stream and by coding using the prediction mode when recoding in the coding unit, thereby reducing processing amount.

In addition, the transcoder described above may further includes a first cost value generating unit configured to generate a first cost value on the per predetermined unit basis based on decoded information generated in a decoding process performed by the decoding unit, the first cost value indicating coding efficiency when intra prediction is applied, wherein the control unit is further configured to control the coding unit so that the coding unit applies intra prediction or inter prediction according to the first cost value on the per predetermined unit basis when coding the decoded image data.

With this configuration, the first cost value is generated based on decoded information generated during decoding processing, so that it is not necessary to generate the first cost value at the time of coding, and thus it is possible to reduce the processing amount of the transcoder as a whole. For example, it is possible to omit the processing of: generating intra prediction image data at the time of coding; and calculating the difference between the generated intra prediction image data and the decoded image data.

Furthermore, the first cost value generating unit may generate the first cost value that is smaller as the coding efficiency when intra prediction is applied is higher, and the control unit may control the coding unit so that the coding unit applies intra prediction when the first cost value is smaller than a first threshold.

With this configuration, it is possible to simply select a prediction method to be applied at the time of coding, and thus it is possible to reduce the processing amount of the transcoder as a whole.

Furthermore, the coding unit described above may include: an inter prediction unit configured to generate inter prediction image data by applying inter prediction to the decoded image data on the per predetermined unit basis; a second cost value generating unit configured to generate a second cost value on the per predetermined unit basis based on the inter prediction image data, the second cost value indicating coding efficiency when inter prediction is applied; an intra prediction unit configured to generate intra prediction image data by applying using the prediction mode, intra prediction on the per predetermined unit basis; and a third cost value generating unit configured to generate a third cost value on the per predetermined unit basis based on the intra prediction image data, the third cost value indicating coding efficiency when intra prediction is applied, and the control unit may control, when the first cost value is equal to or larger than the first threshold, the coding unit so that the coding unit compares the second cost value and the third cost value and applies intra prediction or inter prediction based on a result of the comparing.

With this configuration, it is possible to generate, again at the time of coding, the third cost value that indicates coding efficiency in the case where intra prediction is performed, and to select a prediction method base on the generated third cost value. Thus it is possible to perform transcoding by applying a further optimal prediction method.

Furthermore, the control unit may control the coding unit so that the coding unit generates the second cost value after determining that the first cost value is equal to or larger than the first threshold and compares the second cost value and the third cost value.

With this configuration, a cost value that indicates coding efficiency in the case where inter prediction is performed can be generated, at the time of coding, after comparing a threshold and the first cost value that indicates coding efficiency of intra prediction and thus it is possible to increase efficiency in transcoding operation. For example, in the case where the first cost value is smaller than the first threshold, it is possible to omit the processing of estimating motion vector and the processing of motion compensation for performing inter prediction.

Furthermore, the control unit may control the coding unit so that the coding unit compares the second cost value and the third cost value and applies intra prediction when the coding efficiency indicated by the third cost value is higher than the coding efficiency indicated by the second cost value.

With this configuration, it is possible to code decoded image data by applying a further optimal prediction method when coding during transcoding.

In addition, the transcoder may further include a coding parameter generating unit configured to generate a coding parameter based on the first cost value, the coding parameter used for setting at least one of a search range of motion estimation and the number of reference images.

With this configuration, it is possible to use, at the time of coding, the coding parameter generated based on the first cost value generated for each of the MBs in one frame, and thus coding efficiency can be increased.

Furthermore, the coding parameter generating unit may count a result of comparing the first cost value and the first threshold and to generate the coding parameter according to a result of the counting.

With this configuration, it is possible to use, at the time of coding, the coding parameter generated based on the first cost value generated for each of the MBs in one frame, and thus coding efficiency can further be increased.

Furthermore, the coding unit may include: an intra prediction unit configured to generate intra prediction image data by applying using the prediction mode, intra prediction on the per predetermined unit basis; a third cost value generating unit configured to generate a third cost value on the per predetermined unit basis based on the intra prediction image data, the third cost value being smaller as coding efficiency when intra prediction is applied is higher; an inter prediction unit configured to generate inter prediction image data by applying inter prediction to the decoded image data on the per predetermined unit basis; and a second cost value generating unit configured to generate a second cost value on the per predetermined unit basis based on the inter prediction image data, the second cost value indicating coding efficiency when inter prediction is applied, and the control unit may control the coding unit so that the coding unit generates the inter prediction image data and the second cost value after determining that the third cost value is equal to or larger than a second threshold.

Furthermore, the present invention can be implemented as a digital recorder provided with the transcoder described above.

Furthermore, the present invention can be implemented as a method including, as its steps, the processing units included in the transcoder, in addition to be implemented as a transcoder.

A method of transcoding according to an aspect of the present invention is a method of transcoding for converting a first coded stream to at least part of which intra prediction is applied, into a second coded stream to which intra prediction and inter prediction are applied, the method comprising: decoding the first coded stream on a per predetermined unit basis to generate decoded image data; obtaining a prediction mode of intra prediction applied when decoding the first coded stream in the decoding; and coding the decoded image data by applying intra prediction or inter prediction on the per predetermined unit basis to generate the second coded stream, wherein in the coding, the prediction mode obtained in the obtaining is used when intra prediction is applied.

In addition, the present invention may be implemented as a program that causes a computer to execute the steps. Furthermore, the present invention may be implemented as a computer-readable recording medium on which the program is stored, such as a CD-ROM (compact disc-read only memory), and information, data, or a signal which represent the program. Furthermore, the program, the information, the data and the signal may be distributed via a communication network such as the Internet.

With the present invention, it is possible to reduce processing amount for recoding when transcoding a coded stream to which at least intra prediction is applied, into a coded stream to which intra prediction and inter prediction are applied.

BRIEF DESCRIPTION OF DRAWINGS

FIG. 5 is a diagram which shows an example of a table in which a sub-block and a prediction mode in H.264/AVC coding standard are associated with each other.

FIG. 10 is a flowchart which shows a specific operation of the coding unit according to Embodiment 1 of the present invention.

FIG. 14 is a diagram which shows an example of a table in which a sub-block, a prediction mode, and a first cost value in H.264/AVC coding standard are associated with each other.

DETAILED DESCRIPTION OF THE INVENTION

[Embodiment 1]

The following describes in detail a transcoder and a method of transcoding according to the present invention based on embodiments with reference to the drawings.

(Embodiment 1)

A transcoder according to Embodiment 1 is a transcoder which converts a first coded stream to at least part of which intra prediction is applied, into a second coded stream to which intra prediction and inter prediction are applied, the transcoder including: a decoding unit configured to decode the first coded stream on a per predetermined unit basis to generate decoded image data; a prediction mode obtaining unit configured to obtain a prediction mode of intra prediction applied when the decoding unit decodes the first coded stream; a coding unit configured to code the decoded image data by applying intra prediction or inter prediction on the per predetermined unit basis to generate the second coded stream; and a control unit configured to control the coding unit so that the coding unit uses the prediction mode obtained by the prediction mode obtaining unit, when the coding unit applies intra prediction.

Figure 1:
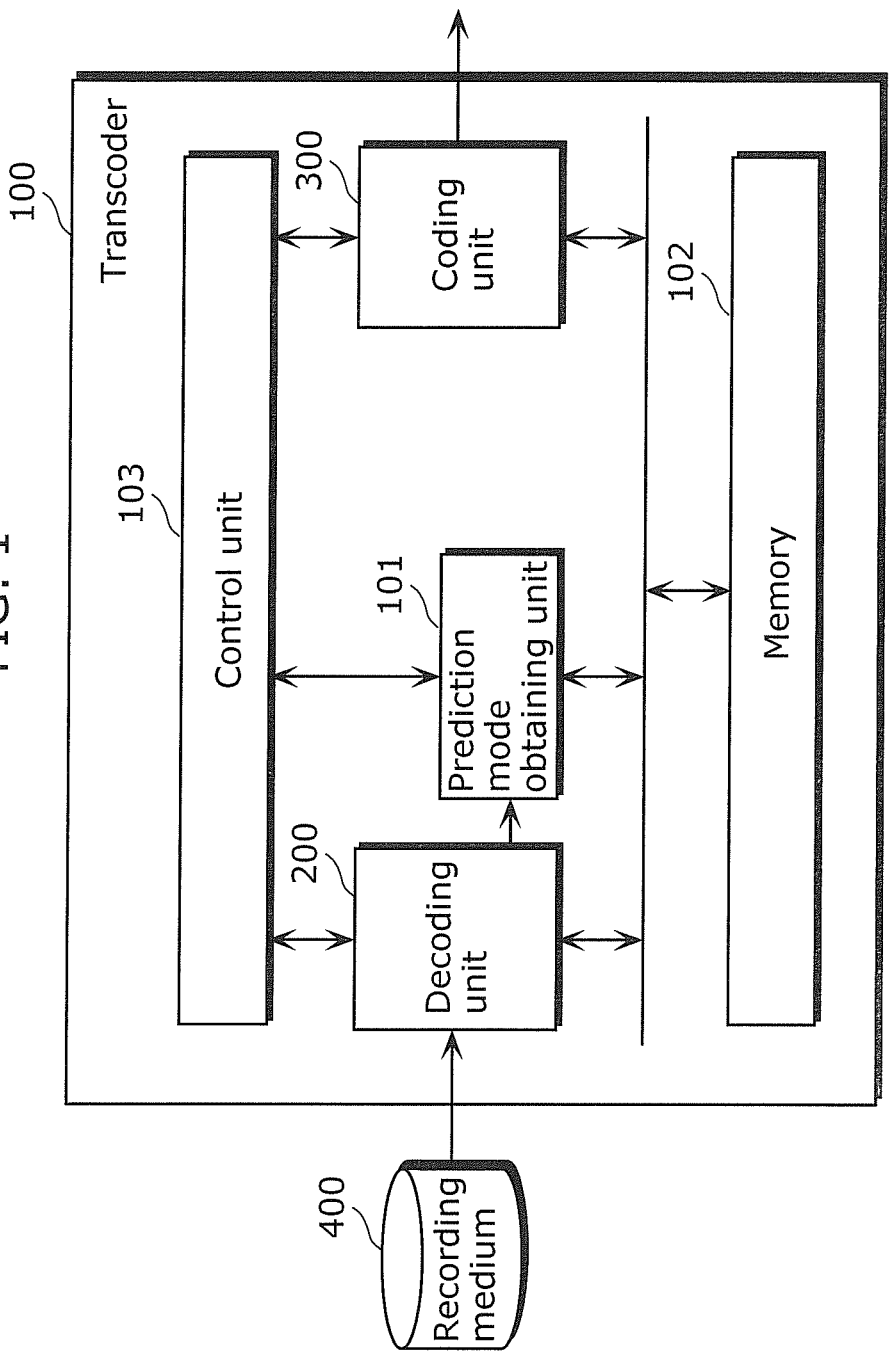
FIG. 1 is a block diagram which shows a configuration of a transcoder according to Embodiment 1 of the present invention.

FIG. 1 is a block diagram which shows a configuration of a transcoder 100 according to Embodiment 1.

As shown in FIG. 1, the transcoder 100 includes: a prediction mode obtaining unit 101; a memory 102; a control unit 103; a decoding unit 200; and a coding unit 300. The transcoder 100 reads a stream A from a recording medium 400, decodes the read stream A into decoded image data at the decoding unit 200, and recodes the decoded image data into a stream B at the coding unit 300.

Here, the recording medium 400 is a recording medium such as a BD (a Blu-ray Disc) provided outside the transcoder 100 as shown in FIG. 1, for example. Furthermore, the recording medium 400 may be a recording medium such as an HDD (Hard Disk Drive) provided inside the transcoder 100.

Furthermore, the stream A is an example of a first coded stream read from the recording medium 400 by the transcoder 100 and, as an example, a stream that has been coded by applying only intra prediction. Furthermore, the stream B is an example of a second coded stream output from the transcoder 100, and a stream that has been coded by applying at least one of intra prediction and inter prediction.

Furthermore, the decoding unit 200 and the coding unit 300 perform processing in units of a macroblock (hereinafter referred to as MB) including 16×16 pixels, or a sub-block resulted from further segmenting the MB. It is to be noted that an inputted signal including a luminance signal and a chrominance signal is processed in the transcoder 100 in general, however, only the luminance signal is described for the sake of convenience in the following embodiments.

The decoding unit 200 decodes, on a per predetermined unit basis, the stream A read from the recording medium 400 to generate decoded image data. A specific configuration is described later. The predetermined unit here indicates a MB or a sub-block which is resulted from segmenting the MB and which is set for each processing in the decoding unit 200.

Furthermore, when decoding the stream A, the decoding unit 200 extracts: information on the entire sequence (Sequence Parameter Set, and the like); information on the entire picture (Picture Parameter Set, and the like); slice information (Slice header); and MB information that is coded data corresponding to one MB including luminance information, from the stream A. The decoding unit 200 decodes the stream A that has been input, based on the extracted information, to generate decoded image data.

The coding unit 300 codes the decoded image data by applying intra prediction or inter prediction on a per predetermined unit basis to generate the stream B.

More specifically, the coding unit 300 generates a prediction image by applying intra prediction or inter prediction to the decoded image data generated by the decoding unit 200 and calculates the difference between the generated prediction picture and the decoded image data. Then the coding unit 300 performs orthogonal transformation, quantization, and variable length coding on the calculated difference data, to generate the stream B including a coded image and coded information that includes a motion vector and so on. The coding unit 300 according to Embodiment 1, when applying the intra prediction, uses a prediction mode obtained by the prediction mode obtaining unit 101 to perform coding.

The prediction mode obtaining unit 101 obtains the prediction mode of the intra prediction applied when the decoding unit 200 decodes the stream A. More specifically, the prediction mode obtaining unit 101 obtains, on a per predetermined unit basis, the prediction mode of a MB to which intra prediction is applied, using the MB information generated in variable length decoding performed by the decoding unit 200 on the stream A read from the recording medium 400. Here, the intra prediction is a method of predicting a pixel value in a MB using a coded pixel in a picture. Furthermore, the prediction mode of the intra prediction indicates a prediction direction in the case where intra prediction is applied.

It is to be noted that, in the case of a luminance signal, the predetermined unit includes: a 16×16 sub-block including 16×16 pixels; a 8×8 sub-block including 8×8 pixels; and a 4×4 sub-block including 4×4 pixels.

Figure 2:
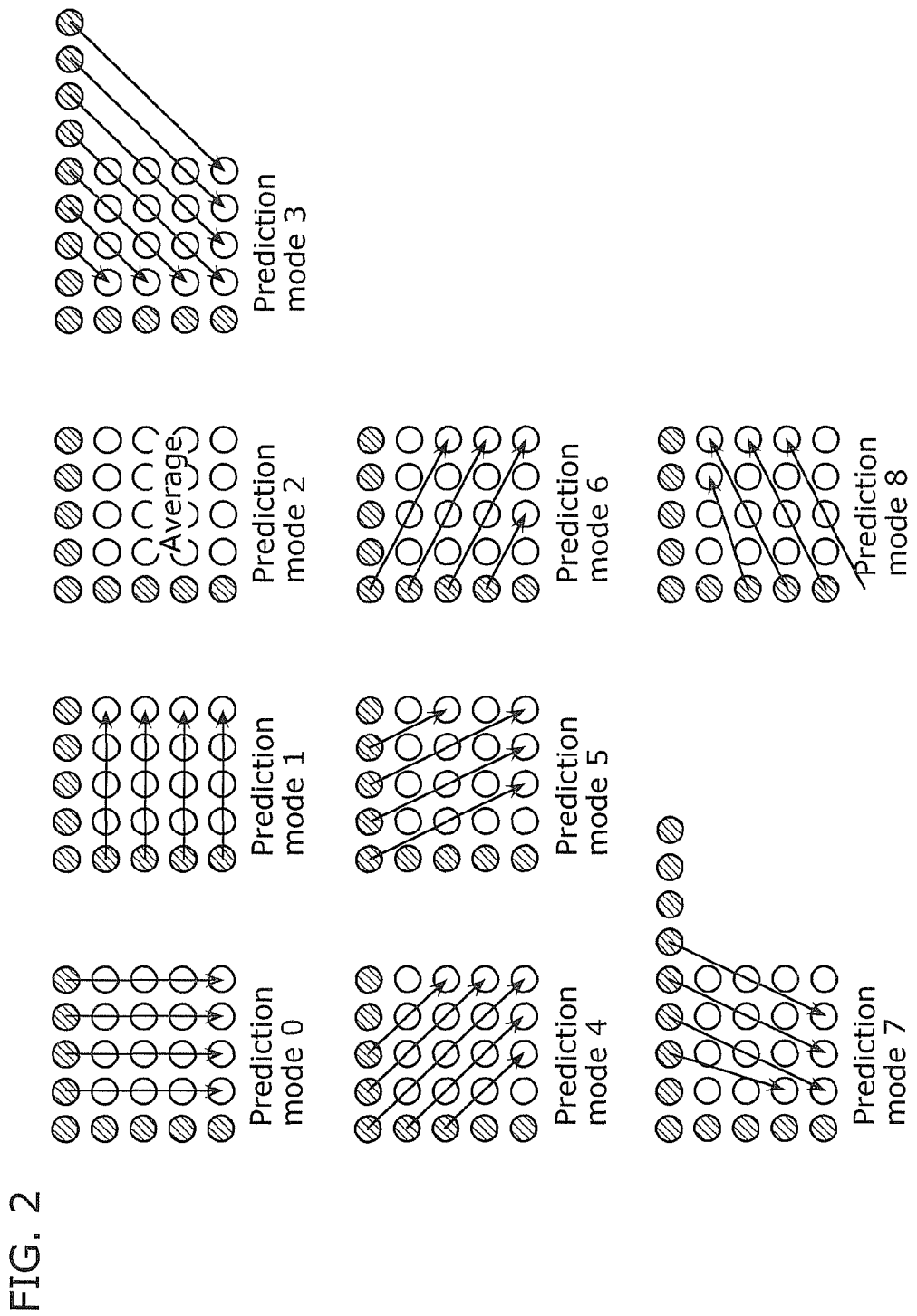
FIG. 2 is a diagram which shows a prediction mode type that is applied to 4×4 sub-blocks in H.264/AVC coding standard.
Figure 3:
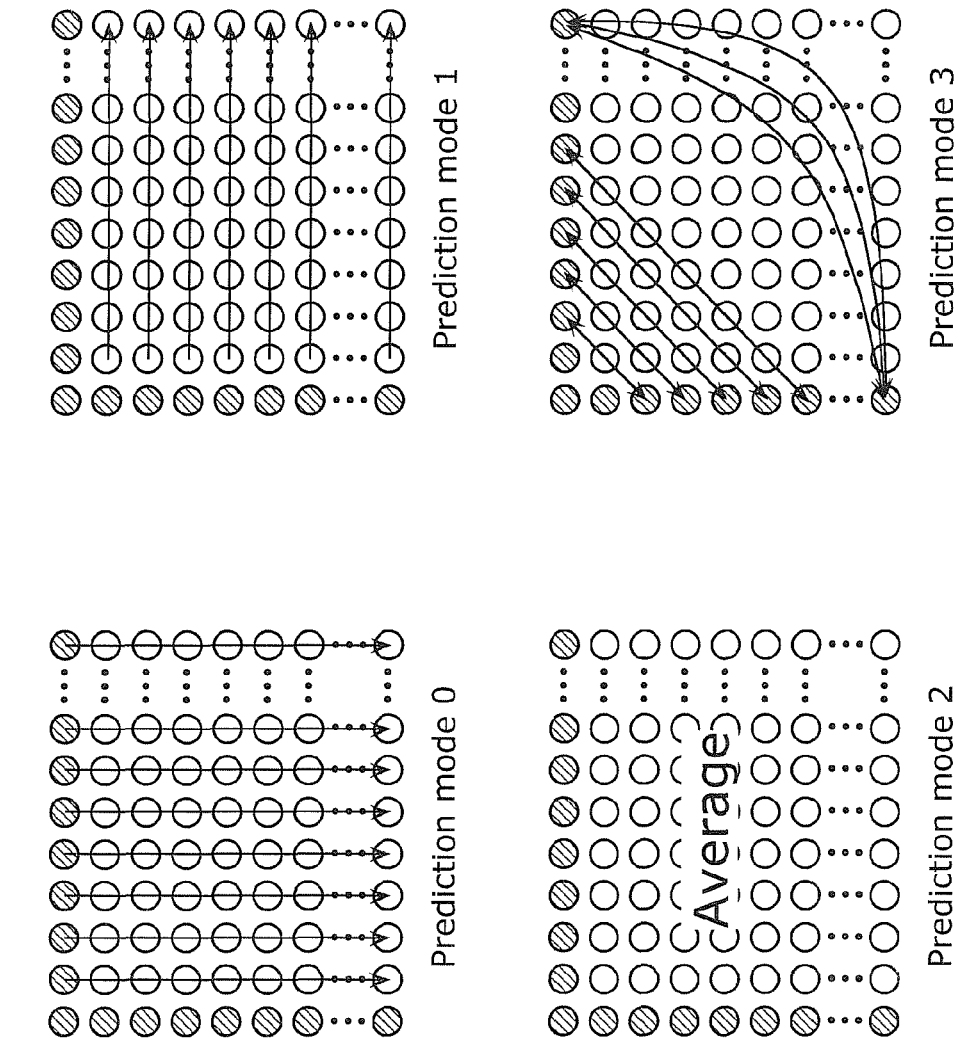
FIG. 3 is a diagram which shows a prediction mode type that is applied to 16×16 sub-blocks in H.264/AVC coding standard.

Furthermore, nine types of prediction modes are prepared for each of the 4×4 sub-block and the 8×8 sub-block. More specifically, nine types of prediction modes including a prediction mode 0 to a prediction mode 8 are prepared for the 4×4 sub-block as shown in FIG. 2. It is to be noted that the prediction mode as shown in FIG. 2 is extended to 8×8 pixels for the 8×8 sub-block. Furthermore, four types of prediction modes are prepared for the 16×16 sub-block. More specifically, four types of prediction modes including a prediction mode 0 to a prediction mode 3 are prepared for the 16×16 sub-block as shown in FIG. 3.

The memory 102 is configured with a recordable unit such as a flash memory, a DRAM, a ferroelectric memory, and an HDD. The memory 102 is capable of recording and reading of the decoded image data output from the decoding unit 200 and the prediction mode obtained for each MB by the prediction mode obtaining unit 101, based on a control by the control unit 103.

The control unit 103 controls the transcoder 100 as a whole. The control unit 103 controls, for example, a timing of each processing performed in the decoding unit 200 and the coding unit 300. Further, the control unit 103 records and reads the decoded image data and the prediction mode on and from the memory 102. It is to be noted that the control unit 103 is assumed to manage the decoded image data and the prediction mode, associating the decoded image data and the prediction mode with each other.

Figure 4:
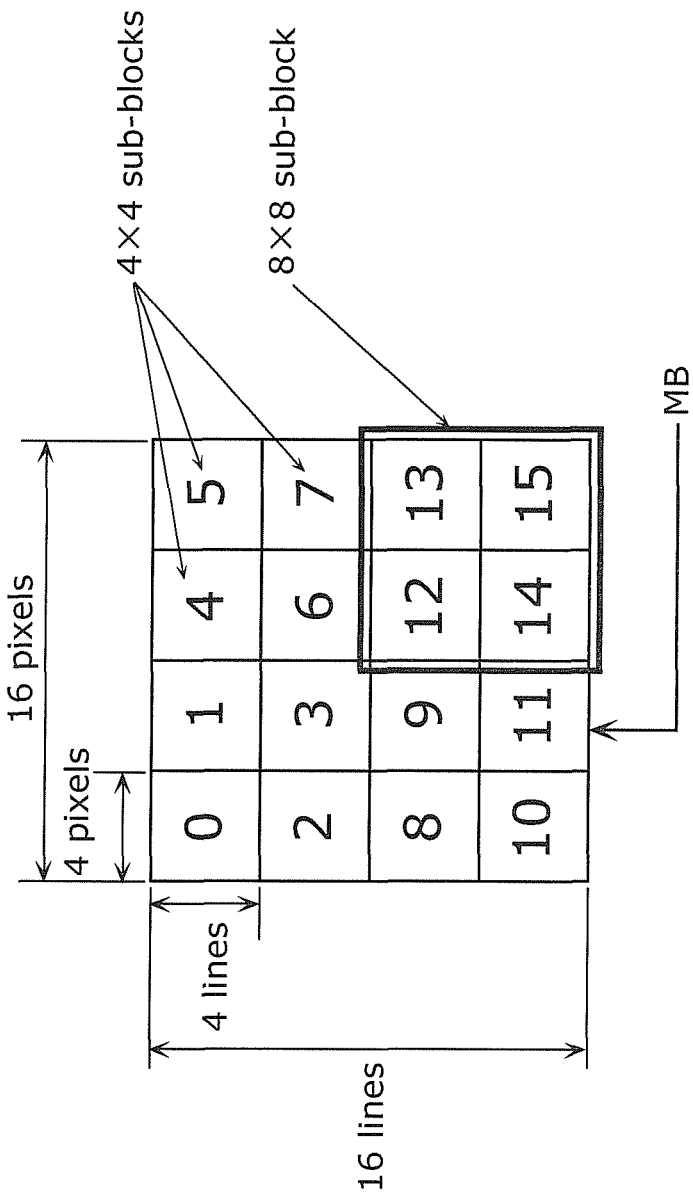
FIG. 4 is a diagram which shows a relation between a macroblock and sub-blocks in H.264/AVC coding standard.

For example, when the 4×4 sub-block can be identified by number as shown in FIG. 4, the control unit 103 is assumed to perform writing by associating a sub-block number with a prediction mode as shown in FIG. 5 at the time of writing on the memory 102. That means 16 block numbers and prediction modes are associated with each other when the prediction mode is set per a 4×4 sub-block in a single MB.

It is to be noted that, the 4×4 sub-block is described in FIG. 5, and when the prediction mode is set per a 8×8 sub-block in a single MB, four block numbers and prediction modes are associated with each other. It is to be noted that it is also possible to manage the prediction mode in the same manner in the case where the prediction mode is set per a single MB, that is, a 16×16 sub-block.

It is to be noted that the method of managing a prediction mode is not limited to the method above, but any method may be used as long as the block number and the prediction mode can be associated with each other, such as the case where a memory address is the block number and the prediction mode is recorded so as to be associated with the memory address, for example.

Furthermore, the control unit 103 can be implemented using a semiconductor device or the like, and may include only hardware, or may be implemented by combining hardware and a software. Furthermore, the control unit 103 may include plural devices. It is to be noted that, when the control unit 103 is implemented with software, it is possible to implement by using a microprocessor.

The following describes a specific configuration of the decoding unit 200 with reference to the drawings.

Figure 6:
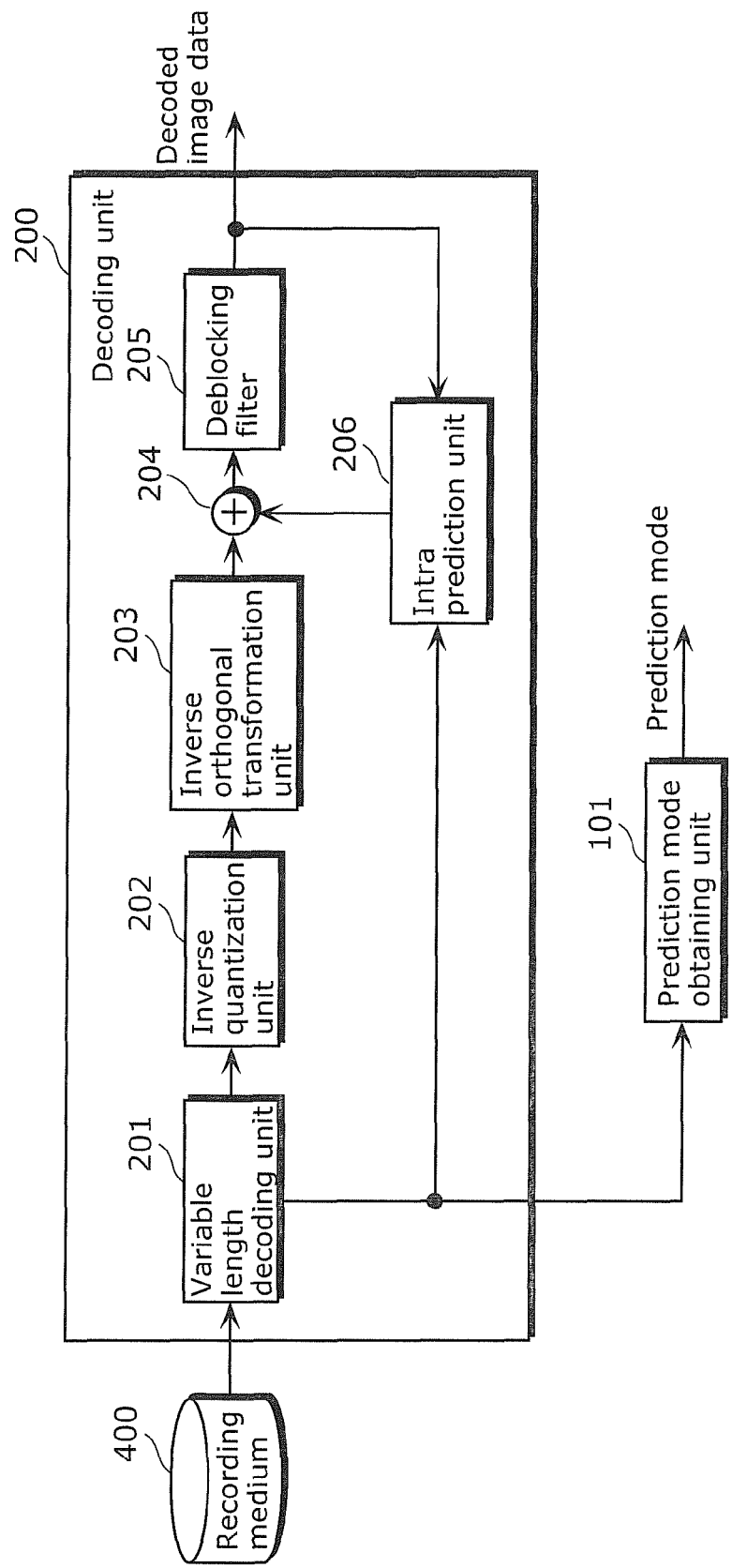
FIG. 6 is a block diagram which shows a specific configuration of a decoding unit according to Embodiment 1 of the present invention.

FIG. 6 is a block diagram which shows a specific configuration of the decoding unit 200 according to Embodiment 1 of the present invention.

The decoding unit 200 includes: a variable length decoding unit 201; an inverse quantization unit 202; an inverse orthogonal transformation unit 203; an adder 204; a deblocking filter 205; and an intra prediction unit 206.

The variable length decoding unit 201 performs variable length decoding, for each MB, on a coded stream on which variable length coding is performed, thereby generating the above-described MB information including a quantized coefficient (luminance information) corresponding to the MB. The variable length decoding unit 201 outputs the generated quantized coefficient to the inverse quantization unit 202.

The MB information includes prediction mode information that defines a prediction mode when an intra prediction is used for the MB. The prediction mode obtaining unit 101 obtains the prediction mode information included in the MB information, thereby obtaining the prediction mode applied to the MB. For example, the variable length decoding unit 201 performs variable length decoding on a MB to which intra prediction is applied for each of the 4×4 sub-blocks shown in FIG. 4, so that the prediction mode obtaining unit 101 obtains 16 prediction modes.

The inverse quantization unit 202 inversely quantizes the quantized coefficient output from the variable length decoding unit 201 to reconstruct a DCT (Discrete Cosine Transform) coefficient, and outputs the reconstructed DCT coefficient to the inverse orthogonal transformation unit 203.

The inverse orthogonal transformation unit 203 performs inverse orthogonal transformation on the DCT coefficient output from the inverse quantization unit 202 to reconstruct residual image data, and outputs the reconstructed residual image data to the adder 204.

The adder 204 adds the residual image data output from the inverse orthogonal transformation unit 203 to prediction image data output from the intra prediction unit 206 to generate decoded image data, and outputs the generated decoded image data to the deblocking filter 205.

The deblocking filter 205 performs deblocking filtering on the decoded image data output from the adder 204, and then outputs the decoded image data to an external device (here, the memory 102).

The intra prediction unit 206 obtains a prediction mode necessary for performing intra prediction, using the MB information output from the variable length decoding unit 201. Then the intra prediction unit 206 generates prediction image data, using the obtained prediction mode, and outputs the generated prediction image data to the adder 204.

It is to be noted that, when the prediction mode cannot be obtained, the intra prediction unit 206 may perform intra prediction on the decoded image data output from the deblocking filter 205 to generate prediction image data. Furthermore, the intra prediction unit 206 may use the prediction mode obtained by the prediction mode obtaining unit 101.

The following describes a specific configuration of the coding unit 300 with reference to the drawings.

Figure 7:
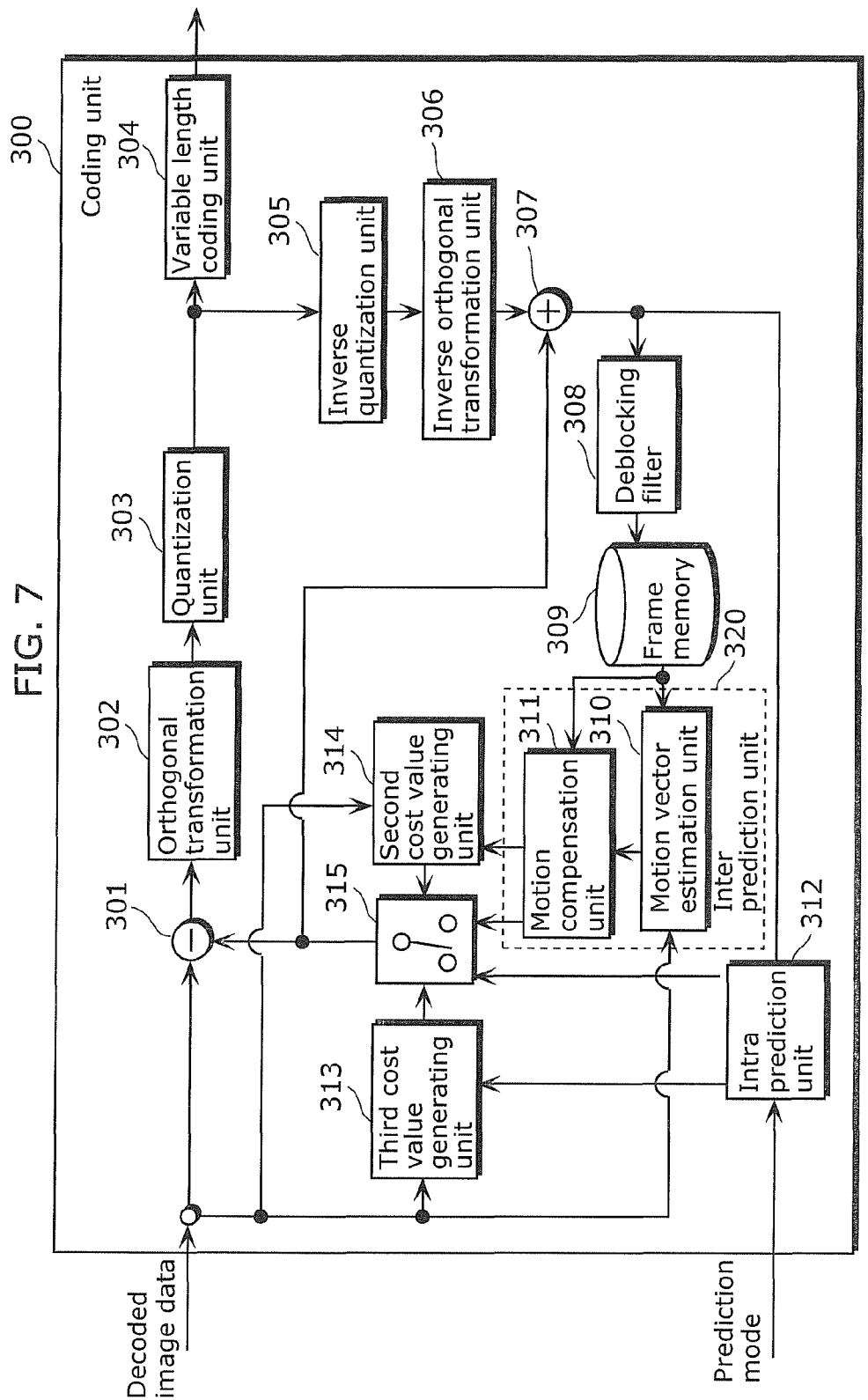
FIG. 7 is a block diagram which shows a specific configuration of a coding unit according to Embodiment 1 of the present invention.

FIG. 7 is a block diagram which shows a specific configuration of the coding unit 300 according to Embodiment 1 of the present invention.

The coding unit 300 includes: a subtractor 301; an orthogonal transformation 302; a quantization unit 303; a variable length coding unit 304; an inverse quantization unit 305; an inverse orthogonal transformation unit 306; an adder 307; a deblocking filter 308; a frame memory 309; a motion vector estimation unit 310; a motion compensation unit 311; an intra prediction unit 312; a third cost value generating unit 313; a second cost value generating unit 314; and a prediction method selecting unit 315. It is to be noted that the motion vector estimation unit 310 and the motion compensation unit 311 are included in the inter prediction unit 320.

The subtractor 301 calculates, for each of the MBs, a difference between the decoded image data read from the memory 102 and prediction image data which is generated in the intra prediction unit 312 or the motion compensation unit 311 and is output from the prediction method selecting unit 315 to generate residual image data. The generated residual image data is output to the orthogonal transformation unit 302.

The orthogonal transformation unit 302 performs orthogonal transformation on the residual image data output from the subtractor 301 to generate a DCT coefficient, and outputs the generated DCT coefficient to the quantization unit 303.

The quantization unit 303 quantizes the DCT coefficient output from the orthogonal transformation unit 302 to generate a quantized coefficient, and outputs the generated quantized coefficient to the variable length coding unit 304 and the inverse quantization unit 305.

The variable length coding unit 304 performs variable length coding on the quantized coefficient output from the quantization unit 303 to generate coded image data, and outputs the generated coded image data, as a stream B, to an external device.

The inverse quantization unit 305 inversely quantizes the quantized coefficient output from the quantization unit 303 to reconstruct a DCT coefficient, and outputs the reconstructed DCT coefficient to the inverse orthogonal transformation unit 306.

The inverse orthogonal transformation unit 306 performs inverse orthogonal transformation on the DCT coefficient output from the inverse quantization unit 305 to reconstruct residual image data, and outputs the reconstructed residual image data to the adder 307.

The adder 307 adds the residual image data output from the inverse orthogonal transformation unit 306 to the prediction image data which is generated in the intra prediction unit 312 or the motion compensation unit 311 and is output from the prediction method selecting unit 315 to generate decoded image data, and outputs the generated decoded image data to the deblocking filter 308 and the intra prediction unit 312.

The deblocking filter 308 performs deblocking filtering on the decoded image data output from the adder 307, and outputs, to the frame memory 309, the decoded image data on which deblocking filtering processing is performed.

The frame memory 309 stores the decoded image data output from the deblocking filter 308. The frame memory 309 is configured with a recordable unit such as a flash memory, a DRAM, and a ferroelectric memory.

The motion vector estimation unit 310 estimates a motion vector corresponding to the decoded image data stored in the frame memory 309, using the MB that is currently to be coded. It is to be noted that, for the processing size of a MB processed by the motion vector estimation unit 310, seven types are defined, according to H.264/AVC standard, as the pixel size of sub-blocks, that is, 16×16, 16×8, 8×16, 8×8, 8×4, 4×8, and 4×4 pixel size, for example. The motion vector estimation unit 310 selects one from the seven types for each of the MBs.

The motion compensation unit 311 generates prediction image data performing motion compensation on the decoded image data stored in the frame memory 309, using the motion vector estimated by the motion vector estimation unit 310.

It is to be noted that the inter prediction unit 320, as shown in FIG. 7, includes the motion vector estimation unit 310 and the motion compensation unit 311. With this, the inter prediction unit 320 applies inter prediction to decoded image data for each of the MBs to generate an inter prediction image as the prediction image data.

The intra picture prediction unit 312 applies intra picture prediction to the decoded image data output from the adder 307, using the prediction mode stored in the memory 102 and associated with a MB which is the target of coding, thereby generating prediction image data. In other words, the intra prediction unit 312 applies intra prediction for each of the MBs of the decoded image data, using the prediction mode obtained by the prediction mode obtaining unit 101, thereby generating an intra prediction image as prediction image data.

The third cost value generating unit 313 calculates a sum of absolute difference (SAD) of the prediction image data output from the intra prediction unit 312 and the decoded image data, as the third cost value, and outputs the calculated third cost value to the prediction method selecting unit 315. Thus, as the third cost value is smaller, the SAD is smaller. More specifically, it indicates that the prediction image data is similar to the decoded image data, and thus higher coding efficiency is obtained. Therefore, the third cost value generating unit 313 generates, for each of the MBs of the decoded image data, the third cost value that becomes smaller as the coding efficiency in the case of applying intra prediction is higher, based on the intra prediction image data.

The second cost value generating unit 314 calculates, as the second cost value, a SAD of the prediction image data on which motion compensation is performed and which is output from the motion compensation unit 311 and the decoded image data, and outputs the calculated second cost value to the prediction method selecting unit 315. The second cost value becomes smaller as the coding efficiency is higher.

It is to be noted that the method of calculating the third cost value and the second cost value is not limited to the SAD, but any value may be used as long as the value indicates coding efficiency such as a mean absolute difference (MAD). Furthermore, the third cost value generating unit 313 and the second cost value generating unit 314 may generate a cost value, as the third cost value and the second cost value, such that the value becomes larger as the coding efficiency is higher.

The prediction method selecting unit 315 outputs, to the subtractor 301, the prediction image data output from one of the intra prediction unit 312 and the motion compensation unit 311, based on the third cost value and the second cost value input from the third cost value generating unit 313 and the second cost value generating unit 314, respectively. More specifically, the prediction method selecting unit 315 compares the third cost value indicating the coding efficiency when intra prediction is used, to the second cost value indicating the coding efficiency when inter prediction is used, selects one of the intra prediction image and the inter prediction image based on a result of the comparing, and outputs the selected prediction image data to the subtractor 301 and the adder 307.

More specifically, the prediction method selecting unit 315 selects an intra prediction image when the coding efficiency indicated by the third cost value is higher than the coding efficiency indicated by the second cost value. Conversely, the prediction method selecting unit 315 selects an inter prediction image when the coding efficiency indicated by the third cost value is lower than the coding efficiency indicated by the second cost value. Sine the third cost value and the second cost value become smaller as the coding efficiency is higher according to the present embodiment, the prediction method selecting unit 315 selects an intra prediction image when the third cost value is smaller than the second cost value, for example.

The following describes a specific operation of the transcoder 100 with reference to the drawings.

Figure 8:
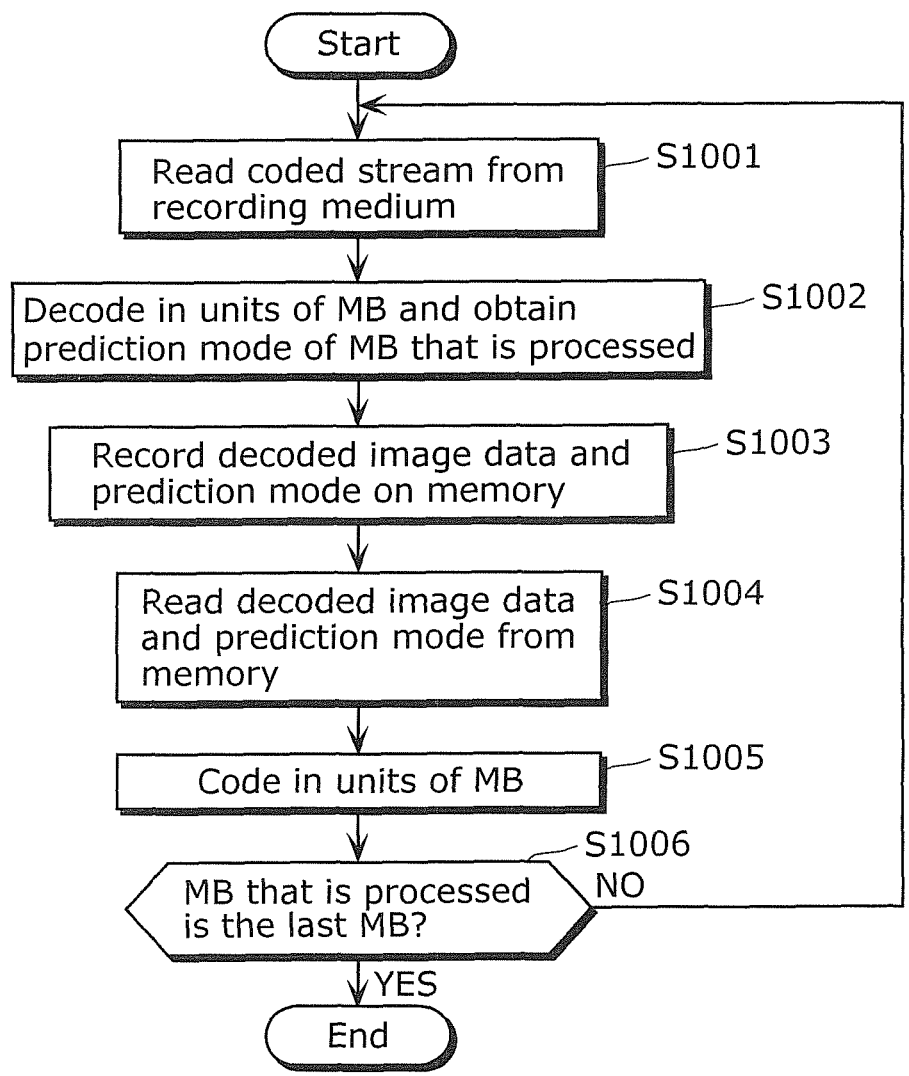
FIG. 8 is a flowchart which shows a specific operation of the transcoder as a whole according to Embodiment 1 of the present invention.

FIG. 8 is a flowchart which shows a specific operation of the transcoder 100 as a whole according to Embodiment 1 of the present invention.

First, the transcoder 100 reads a coded stream (a stream A) from the recording medium 400 (S1001).

Next, the decoding unit 200 decodes the read coded stream in units of a MB. The prediction mode obtaining unit 101 obtains, at the time of decoding, a prediction mode of the MB that is processed (S1002).

The decoding unit 200 records, on the memory 102, decoded image data generated from the decoding processing, and the prediction mode obtaining unit 101 records a prediction mode on the memory 102. Here, the control unit 103 controls the decoding unit 200 and the prediction mode obtaining unit 101 so that the decoded image data and the prediction mode are recorded for each of the MBs (S1003). For example, a prediction mode is recorded on the memory 102 in association with a corresponding one of sub-blocks, as shown in FIG. 5.

Then the coding unit 300 reads, from the memory 102, the decoded image data and the prediction mode managed for each of the MBs (S1004).

Next, the coding unit 300 codes the decoded image data that has been read (S1005). At this time, the coding unit 300 uses the read prediction mode when intra prediction is used in the coding. The operation will be described later in detail.

The control unit 103 determines whether or not the MB that is processed in the coding unit 300 is the last MB (S1006). In the case where the MB is the last MB, the operation is completed as it is, and in the case where there still remains a MB to be processed, the operation returns to Step S1001.

As described above, the transcoder 100 according to the present embodiment decodes a coded stream for each MB, and recodes the decoded stream. It is to be noted that, in such a case where the memory 102 has a sufficient capacity, a coded stream may be decoded and then recoded for each slice or picture. More specifically, the decoding unit 200 may decode a coded stream for one picture to record decoded image data for one picture, and then the coding unit 300 may code the decoded image data for one picture, for example.

The following describes a specific operation of the decoding unit 200 with reference to the drawings.

Figure 9:
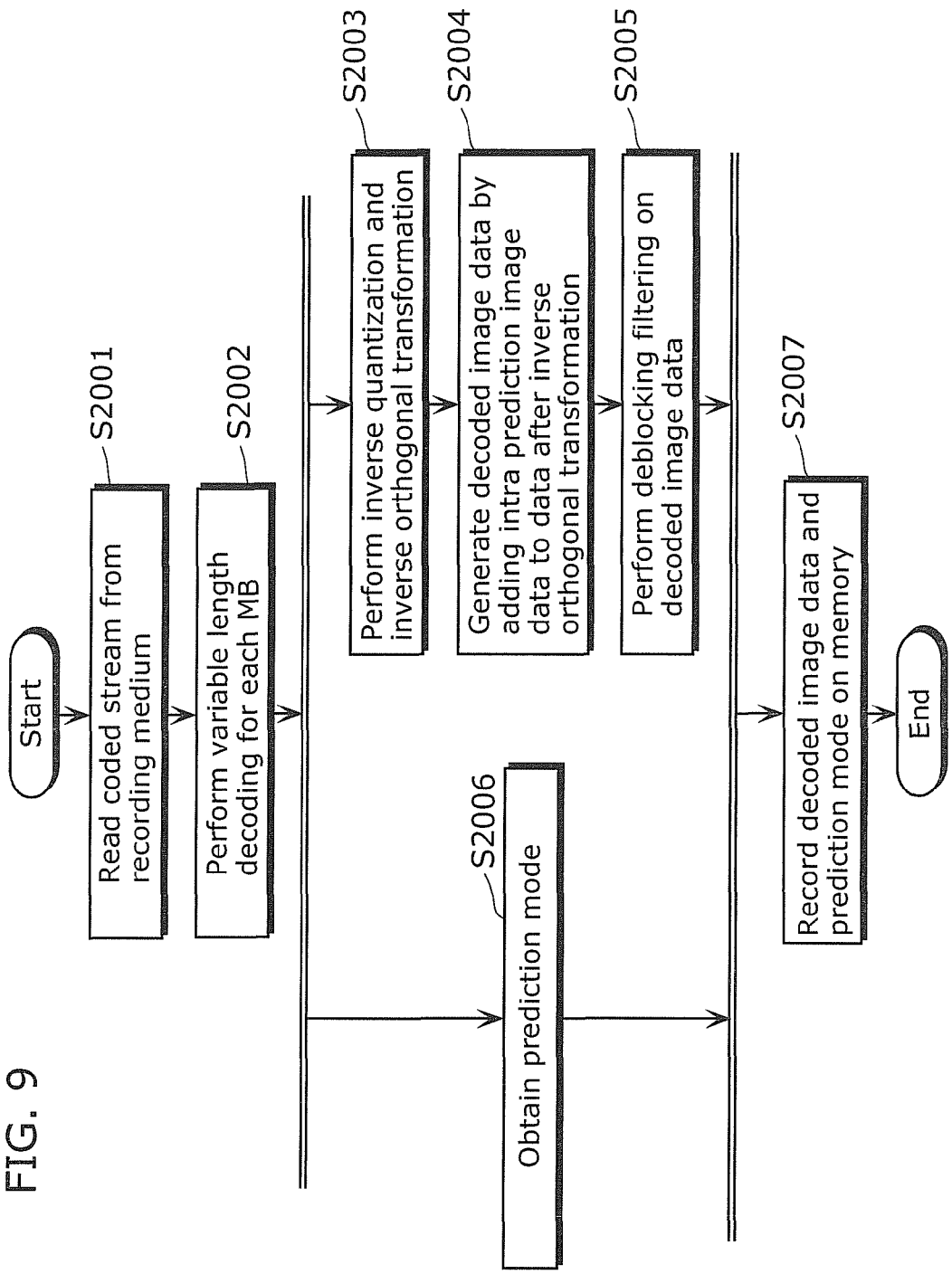
FIG. 9 is a flowchart which shows a specific operation of the decoding unit according to Embodiment 1 of the present invention.

FIG. 9 is a flowchart which shows a specific operation of the decoding unit 200 according to Embodiment 1 of the present invention. It is to be noted that the flowchart shown in FIG. 9 is a diagram that shows in detail an example of processing from Step S1001 to S1003 in FIG. 8.

First, the decoding unit 200 reads a stream A from the recording medium 400 (S2001).

Next, the variable length decoding unit 201 performs variable length decoding on the stream A for each of the MBs to generate a quantized coefficient (S2002).

Next, the inverse quantization unit 202 and the inverse orthogonal transformation unit 203 perform inverse quantization and inverse orthogonal transformation on the generated quantized coefficient to generate residual image data (S2003).

Then, the adder 204 adds prediction image data generated in advance by the intra prediction unit 206 to the residual image data generated by the inverse quantization unit 202 and the inverse orthogonal transformation unit 203 to generate decoded image data (S2004).

Next, the deblocking filter 205 performs deblocking filtering processing on the generated decoded image data (S2005).

Meanwhile, the prediction mode obtaining unit 101 obtains the prediction mode of a MB to be coded using MB information generated when the variable length decoding unit 201 performed variable length decoding on the stream A (S2006). It is to be noted that, in the case where the stream A is a stream to which not only intra prediction but also inter prediction is applied, the prediction mode obtaining unit 101 obtains a prediction mode when the MB to be processed is the MB to which intra prediction is applied.

Then the control unit 103 controls the deblocking filter 205 and the prediction mode obtaining unit 101 to record, on the memory 102, the decoded image data on which deblocking filtering is performed and the obtained prediction mode, in association with each other. It is to be noted that the decoded image data before treated by deblocking filtering and the obtained prediction mode may be recorded in association with each other.

It is to be noted that, in the flowchart shown in FIG. 9, the processing of obtaining a prediction mode performed by the prediction mode obtaining unit 101 (S2006) and the decoding processing performed by the inverse quantization unit 202 to the deblocking filter 205 (S2003 to S2005) are performed in parallel, however, they may be performed sequentially.

The following describes a specific operation of the coding unit 300 with reference to the drawings.

FIG. 10 is a flowchart which shows a specific operation of the coding unit 300 according to Embodiment 1 of the present invention. It is to be noted that the flowchart shown in FIG. 10 is a diagram that indicates in detail an example of processing of Steps S1004 and S1005 in FIG. 8.

First, the coding unit 300 reads the decoded image data from the memory 102 for each of the MBs, and further reads the prediction mode associated with the MB (S3001).

Next, the motion vector estimation unit 310 estimates a motion vector for each block size set by the control unit 103, using the decoded image data stored in the frame memory 309, and outputs the motion vector to the motion compensation unit 311 (S3002).

Next, the motion compensation unit 311 performs motion compensation using the motion vector estimated by the motion vector estimation unit 310 and the decoded image data stored in the frame memory 309 to generate prediction image data that has been motion compensated, that is, inter prediction image data. Then the motion compensation unit 311 outputs the generated inter prediction image data to the prediction method selecting unit 315 and the second cost value generating unit 314 (S3003).

The second cost value generating unit 314 generates the second cost value using the inter prediction image data and outputs the generated second cost value to the prediction method selecting unit 315 (S3004).

Meanwhile, the intra prediction unit 312 performs intra prediction using the prediction mode read using information on a MB to be coded or on a pixel adjacent to a sub-block resulted from segmenting the MB, from among decoded image data output from the adder 307 to generate intra prediction image data. Then the intra prediction unit 312 outputs the generated intra prediction image data to the third cost value generating unit 313 and the prediction method selecting unit 315 (S3005).

The third cost value generating unit 313 generates the third cost value using the intra prediction image data and outputs the generated third cost value to the prediction method selecting unit 315 (S3006).

The prediction method selecting unit 315 selects prediction image data to be output to the subtractor 301 and the adder 307, using the third cost value and the second cost value (S3007). More specifically, the prediction method selecting unit 315 selects the intra prediction image data when the coding efficiency indicated by the third cost value is higher than the coding efficiency indicated by the second cost value, that is, when the third cost value is smaller than the second cost value.

Furthermore, the subtractor 301 calculates the difference between the read decoded image data and the prediction image data output by the prediction method selecting unit 315 to generate residual image data (S3008).

Next, the orthogonal transformation unit 302 and the quantization 303 perform orthogonal transformation and quantization on the generated residual image data to generate a quantized coefficient (S3009).

Furthermore, the variable length coding unit 304 performs variable length coding on the generated quantized coefficient to generate coded data that has been coded, and outputs the generated coded data as a portion of a stream B.

Meanwhile, the inverse quantization unit 305 and the inverse orthogonal transformation unit 306 performs inverse quantization and inverse orthogonal transformation on the quantized coefficient generated by the quantization unit 303 to reconstruct the residual image data, and the reconstructed residual image data is output to the adder 307 (S3011).

Next, the adder 307 adds the residual image data reconstructed by the inverse orthogonal transformation unit 306 and the prediction image data output from the prediction method selecting unit 315 to reconstruct the decoded image data, and the deblocking filter 308 performs deblocking filtering on the reconstructed decoded image data and outputs the decoded image data after the filtering to the frame memory (S3012). It is to be noted that the adder 307 outputs the reconstructed decoded image data to the intra prediction unit 312 as well.

Then the frame memory 309 stores the decoded image data that is input (S3013)

As described above, the transcoder 100 according to the present embodiment is characterized, when performing transcoding on coded data to which intra prediction is applied, in that the prediction mode obtaining unit 101 obtains a prediction mode applied for each MB to be processed or for each sub-block resulted from segmenting the MB and generated at the time of variable length decoding performed by the decoding unit 200, and the prediction mode is used at the time of coding. This configuration eliminates the need to calculate a prediction mode when using intra prediction for coding, making it possible to reduce the processing amount of the transcoder 100 as a whole.

It is to be noted that, in the flowchart shown in FIG. 10, the processing of intra prediction (S3005) and generating the third cost value (S3006) are performed in parallel with the processing of inter prediction (S3002 and S3003) and generating the second cost value (S3004), however, they may be performed sequentially. Furthermore, the processing of variable length coding (S3010) is performed in parallel with the processing of generating a reference image that is referred to when generating prediction image data (S3011 to S3013), however, they may be performed sequentially.

It is to be noted that, when the coding unit 300 does not use a prediction mode obtained by the prediction mode obtaining unit 101 as in the conventional techniques, the intra prediction unit 312 in the coding unit 300 determines a prediction mode of intra prediction by using decoded image data and reconstructed decoded image data that is input from the adder 307. More specifically, the intra prediction unit 312 generates an intra prediction image corresponding to each of the nine types of prediction mode shown in FIG. 2, for example. Then the intra prediction unit 312 outputs, to the prediction method selecting unit 315, an image with the highest coding efficiency among the generated intra prediction images of nine types, as the intra prediction image.

As described above, the processing of determining, by the intra prediction unit 312, the prediction mode is necessary in the conventional techniques. On the other hand, with the transcoder 100 according to the present embodiment, since the intra prediction unit 312 uses the prediction mode generated by the decoding unit 200, it is not necessary to perform the processing for determining a prediction mode, and thus it is possible to reduce the processing amount.

(Embodiment 2)

The transcoder 100 according to Embodiment 1 obtains, at the time of decoding, a prediction mode from a MB that is decoded, and uses the prediction mode in coding of the MB. With this, it is possible to reduce the processing amount of the transcoder 100 as a whole. However, at the time of coding, even when the prediction method selecting unit 315 selects intra prediction, it is necessary to generate the second cost value in order to select intra prediction or inter prediction. In view of the above, therefore, the processing amount of the transcoder 100 as a whole is further reduced by simply selecting intra prediction or inter prediction using only the third cost value without generating the second cost value in the Embodiment 2.

The following describes a transcoder according to Embodiment 2 of the present invention with reference drawings. It is to be noted that, since the configuration of the transcoder according to Embodiment 2 is the same as the configuration of the transcoder 100 according to Embodiment 1, the description therefor is omitted. It is to be further noted that, since the operations of the decoding unit and the prediction mode obtaining unit according to Embodiment 2 are the same as the operations of the decoding unit 200 and the prediction mode obtaining unit 101 according to Embodiment 1, the description therefor is omitted.

The following describes the operation of selecting prediction method performed by the coding unit 300 according to Embodiment 2, with reference to drawings.

Figure 11:
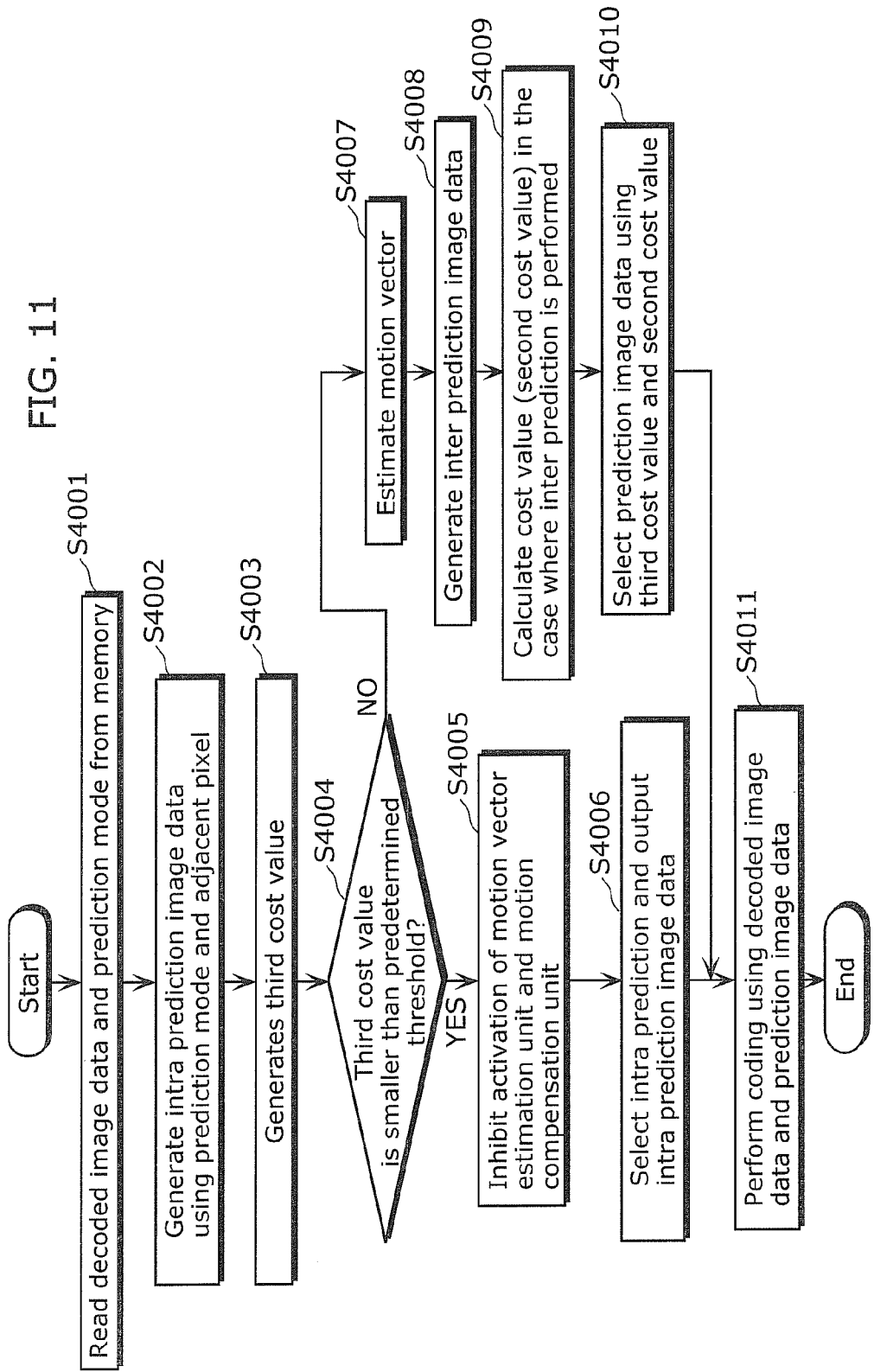
FIG. 11 is a flowchart which shows a specific operation of a coding unit according to Embodiment 2 of the present invention.

FIG. 11 is a flowchart which shows a specific operation of the coding unit 300 according to Embodiment 2 of the present invention. More specifically, FIG. 11 shows an operation of simply selecting intra prediction or inter prediction using the third cost value.

The coding unit 300 reads the decoded image data from the memory 102 for each of the MBs. The coding unit 300, at this time, concurrently reads a prediction mode associated with a corresponding one of the MBs included in the decoded image data or the sub-blocks resulted from segmenting the MBs (S4001).

Next, the intra prediction unit 312 generates intra prediction image data by applying intra prediction according to the prediction mode read using information on a pixel adjacent to a MB to be processed, from among decoded image data output from the adder 307. Then the intra prediction unit 312 outputs the generated intra prediction image to the third cost value generating unit 313 and the prediction method selecting unit 315 (S4002).

The third cost value generating unit 313 generates the third cost value using the intra prediction image data and outputs the generated third cost value to the prediction method selecting unit 315 (S4003).

Then the control unit 103 determines whether or not the third cost value is smaller than a predetermined threshold (S4004). When the third cost value is smaller than the predetermined threshold (YES in S4004), the control unit 103 controls the prediction method selecting unit 315 so that intra prediction image is selected. Furthermore, when the third cost value is larger than the predetermined threshold (NO in S4004), the control unit 103 controls the prediction method selecting unit 315 so that inter prediction image is selected. It is to be noted that the predetermined threshold may be a value that is set based on a limitation value according to the H.264/AVC standard, or may be a value that is set based on decoded information generated during the process of decoding processing.

When it is determined that the third cost value is smaller than the predetermined threshold (YES in S4004), the control unit 103 controls the motion vector estimation unit 310 and the motion compensation unit 311 so that the motion vector estimation unit 310 and the motion compensation unit 311 do not carry out processing (S4005). That means that the control unit 103 inhibits activation of the motion vector estimation unit 310 and the motion compensation unit 311.

Next, the prediction method selecting unit 315 outputs the intra prediction image data generated by the intra prediction unit 312, to the subtractor 301 and the adder 307 (S4006).

On the other hand, when it is determined that the third cost value is larger than the predetermined threshold (NO in S4004), the motion vector estimation unit 310 estimates a motion vector based on the decoded image data stored in the frame memory 309, and outputs the estimated motion vector to the motion compensation unit 311 (S4007).

Next, the motion compensation unit 311 performs inter prediction based on the motion vector estimated by the motion vector estimation unit 310 and the decoded image data stored in the frame memory 309. Then the motion compensation unit 311 generates prediction image data (inter prediction image data) that has been motion compensated and outputs the generated inter prediction image data to the prediction method selecting unit 315 and the second cost value generating unit 314 (S4008).

Next, the second cost value generating unit 314 generates the second cost value based on the prediction image data that has been motion compensated and outputs the generated second cost value to the prediction method selecting unit 315 (S4009).

Further, the prediction method selecting unit 315 selects prediction image data to be output to the subtractor 301 and the adder 307, based on the third cost value and the second cost value, and outputs the selected prediction image data to the subtractor 301 and the adder 307 (S4010).

Then the subtractor 301 generates residual image data based on the prediction image data and the decoded image data. Then the coding unit 300 performs the rest of coding processing based on the residual image data (S4011). More specifically, the coding unit 300 performs orthogonal transformation, quantization, variable length coding, and generation of a reference image to be used for the next coding processing (inverse quantization, inverse orthogonal transformation, and addition).

As described above, with the transcoder according to the present embodiment, the control unit 103 determines whether or not the third cost value is equal to or larger than a predetermined threshold, and controls the coding unit 300, after it is determined that the third cost value is equal to or larger than the predetermined threshold, so that an inter prediction image and the second cost value are generated. More specifically, the transcoder according to the present embodiment, when transcoding coded data to which intra prediction is applied, generates the third cost value indicating coding efficiency of intra prediction prior to performing inter prediction, at the time of selecting prediction method to be applied to a MB to be coded in the coding unit 300. In the case where the third cost value is smaller than the predetermined threshold, it is possible to reduce the processing amount related to inter prediction, by not performing processing related to inter prediction.

It is to be noted that, in particular, the processing amount of the motion vector estimation unit 310 is significantly large. Therefore, it is possible to reduce power consumption of the transcoder 100 by activating the motion vector estimation unit 310 as need arises, and thus the transcoder according to the present embodiment is highly useful.

(Embodiment 3)

As described above, in order to generate the third cost value at the time of coding processing in the transcoder 100, it is necessary to generate intra prediction image data by performing intra prediction in a prediction mode that has been read using information on a pixel adjacent to the MB to be processed, from among decoded image data output from the adder 307. In view of the above, in the Embodiment 3, the first cost value is generated which indicates coding efficiency in the case where intra prediction is applied based on decoded information generated in the decoding process at the time of decoding, and the generated first cost value is output to the coding unit, thereby further reducing the processing amount of the transcoder as a whole.

The following describes a transcoder according to Embodiment 3 of the present invention with reference drawings. It is to be noted that, in Embodiment 3, the same numerals are assigned to the same elements as in Embodiment 1 and the description for the elements is omitted.

Figure 12:
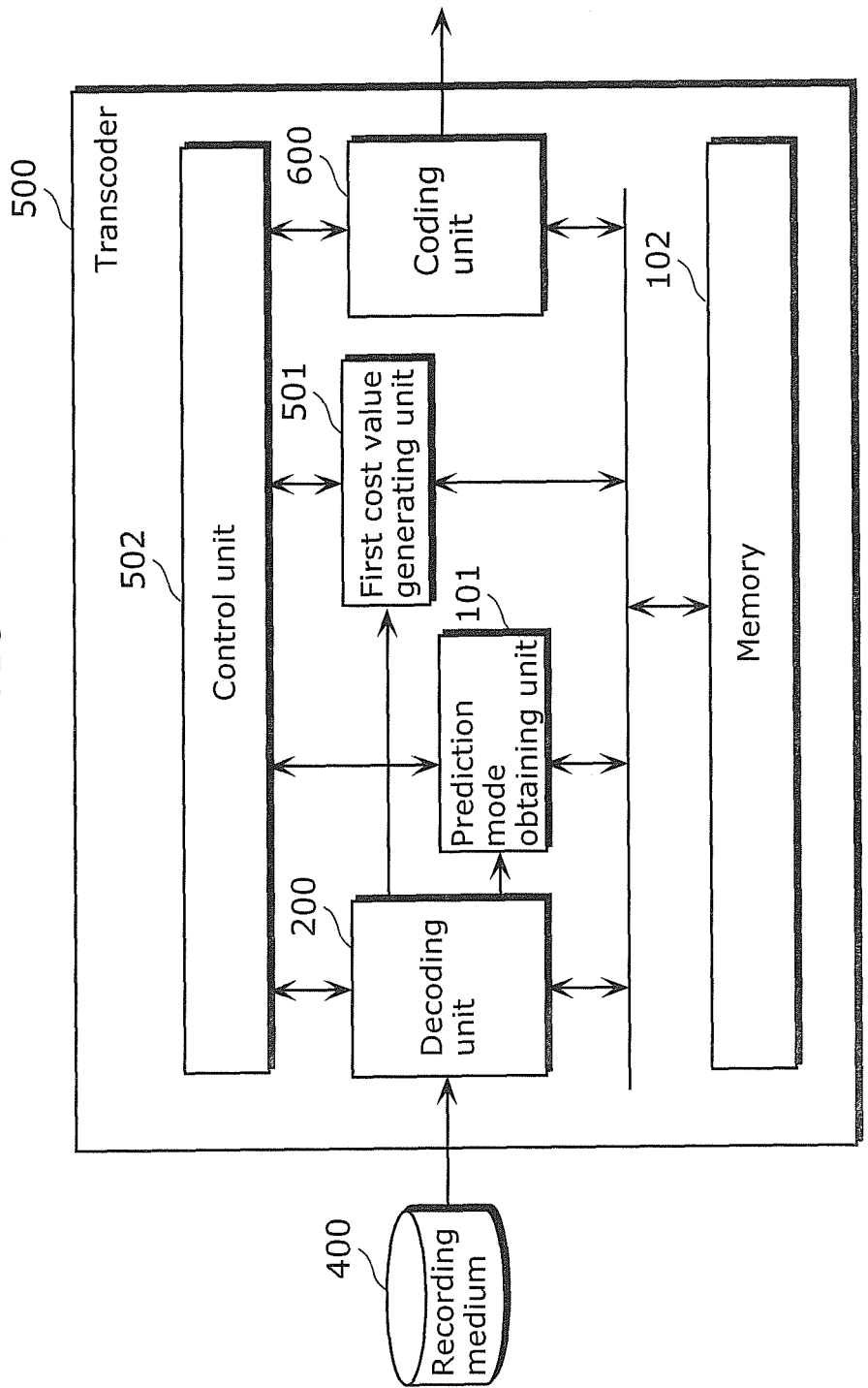
FIG. 12 is a block diagram which shows a configuration of a transcoder according to Embodiment 3 of the present invention.

FIG. 12 is a block diagram which shows a configuration of a transcoder 500 according to Embodiment 3 of the present invention. The transcoder 500 is different from the transcoder 100 according to Embodiment 1 and Embodiment 2, in that the transcoder 500 further includes a first const value generating unit 501, includes a coding unit 600 instead of the coding unit 300, and includes a control unit 502 instead of the control unit 103. In the following description, descriptions for the points same as Embodiment 1 are omitted, and descriptions shall focus on the differences.

The first cost value generating unit 501 generates, on a per predetermined unit basis (for each of the MBs, for example), the first cost value that indicates coding efficiency in the case where intra prediction is performed using decoded information generated during the decoding process of the decoding unit 200. The decoded information may be a quantized coefficient generated when variable length decoding is performed in the decoding unit 200, or may be residual image data generated by performing inverse quantization and inverse orthogonal transformation on the quantized coefficient.

For example, the first cost value generating unit 501 adds a value of the quantized coefficient or a pixel value of the residual image data for each sub-block, thereby generating an add value for each sub-block as the first cost value. It is to be noted that the sum of pixel values of the residual image data corresponds to a sum of absolute difference between the decoded image data and the intra prediction image data (the third cost value) indicated in Embodiment 1.

In order to generate the third cost value corresponding to the first cost value, the coding unit 600 needs to generate intra prediction image data and calculate a sum of absolute difference between the generated intra prediction image data and the decoded image data. With the transcoder 500 according to the present embodiment, it is possible to omit calculation of sum of absolute difference between the intra prediction image data and the decoded image data, and thus the processing amount of the coding unit 600 can be reduced.

Figure 13:
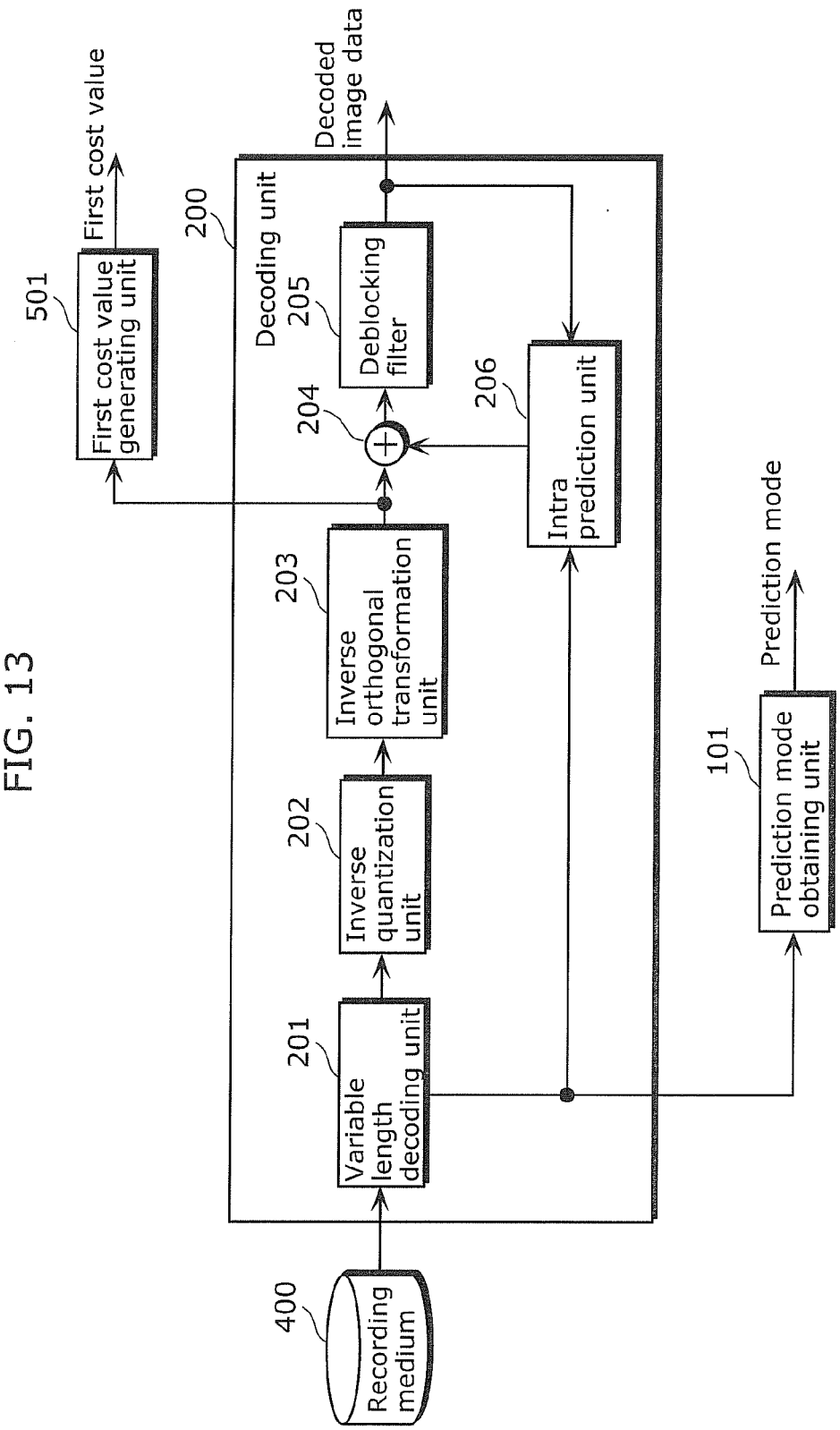
FIG. 13 is a block diagram which shows a specific configuration of a decoding unit according to Embodiment 3 of the present invention.

Here, FIG. 13 is a block diagram which shows a specific configuration of the decoding unit 200 according to Embodiment 3 of the present invention.

As shown in FIG. 13, the first cost value generating unit 501 generates the first cost value based on the residual image data that has been output from the inverse orthogonal transformation unit 203. It is to be noted that, as described above, the first cost value generating unit 501 may generate the first cost value based on the quantized coefficient output from the variable length decoding unit 201 or an inversely quantized conversion coefficient output from the inverse quantization unit 202.

The control unit 502, in addition to the functions of the control unit 103 according to Embodiments 1 and 2, includes the function of managing the decoded image data, the prediction mode, and the first cost value in association with each other for each of the MBs in the memory 102, for recording on and reading from the memory 102. More specifically, the memory 102 stores the prediction mode and the first cost value in association with each other for each sub-block. For example, in the case where 4×4 sub-blocks are assumed to be identified by number as shown in FIG. 4, the control unit 502 is assumed to write, on the memory 102, the sub-block number, the prediction mode, and first cost value in association with each other.

It is to be noted that, the first cost value is generated for each sub-block in the first cost value generating unit 501 described above, and a value that indicates coding efficiency in a unit of a MB in the case of intra prediction is input into the coding unit 600 as the first cost value. For example, the first cost value input into the coding unit 600 is a total value from c0 to c15 shown in FIG. 14. It is to be noted that the first cost value input into the coding unit 600 is not limited to the total value, but may be a value obtained by totaling a part of values from among c0 to c15.

Figure 15:
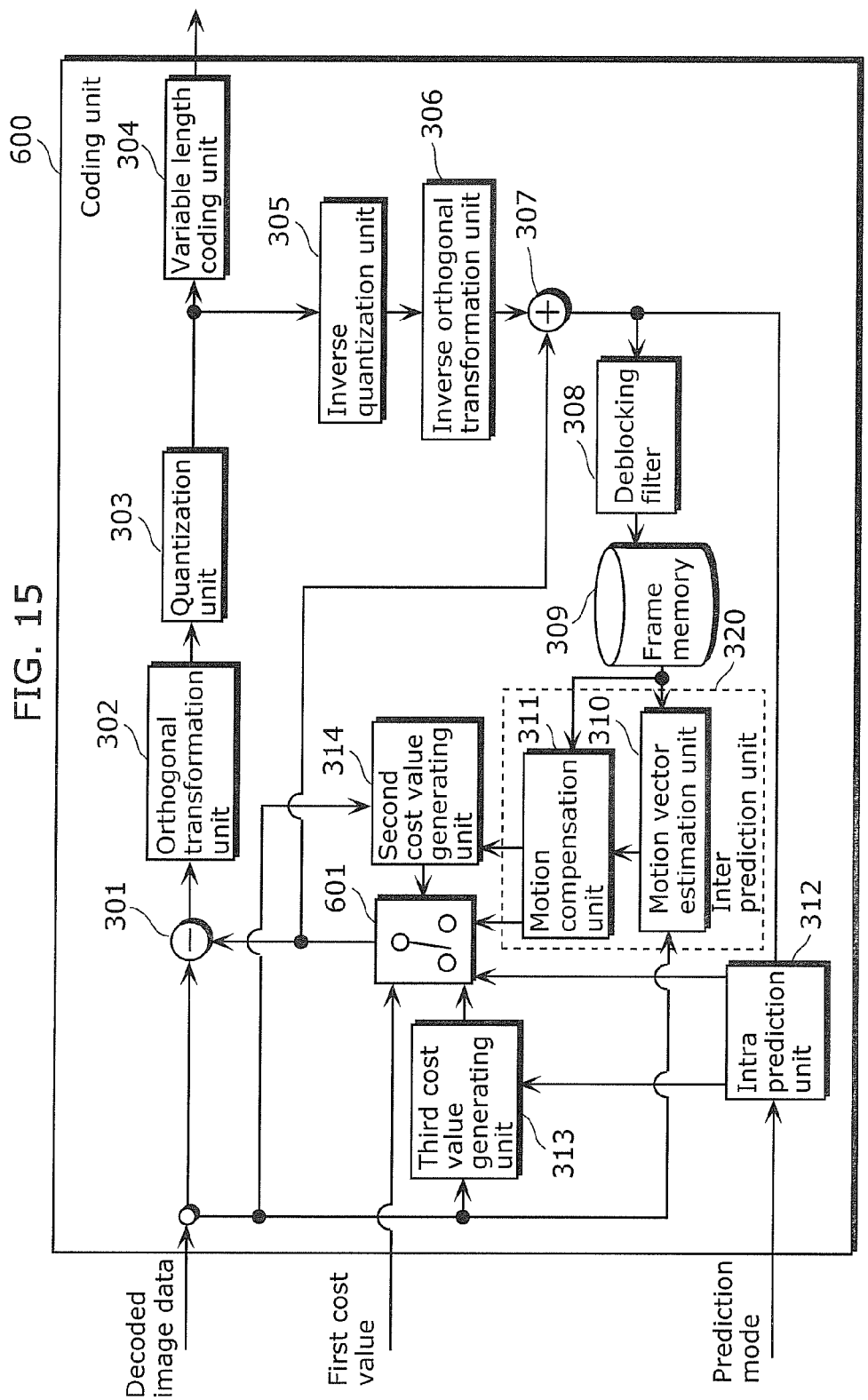
FIG. 15 is a block diagram which shows a specific configuration of a coding unit according to Embodiment 3 of the present invention.

FIG. 15 is a block diagram which shows a specific configuration of the coding unit 600 according to Embodiment 3 of the present invention.

The coding unit 600 is different from the coding unit 300 according to Embodiments 1 and 2 in that the coding unit 600 includes a prediction method selecting unit 601 instead of the prediction method selecting unit 315.

The prediction method selecting unit 601 selects either one of the intra prediction image data and the inter prediction image data based on the first cost value read from the memory 102, the third cost value input from the third cost value generating unit 313, and the second cost value input from the second cost value generating unit 314. The prediction method selecting unit 601 outputs the selected prediction image data to the subtractor 301 and the adder 307.

The following describes a coding operation performed by the coding unit 600 according to Embodiment 3, with reference to drawings.

Figure 16:
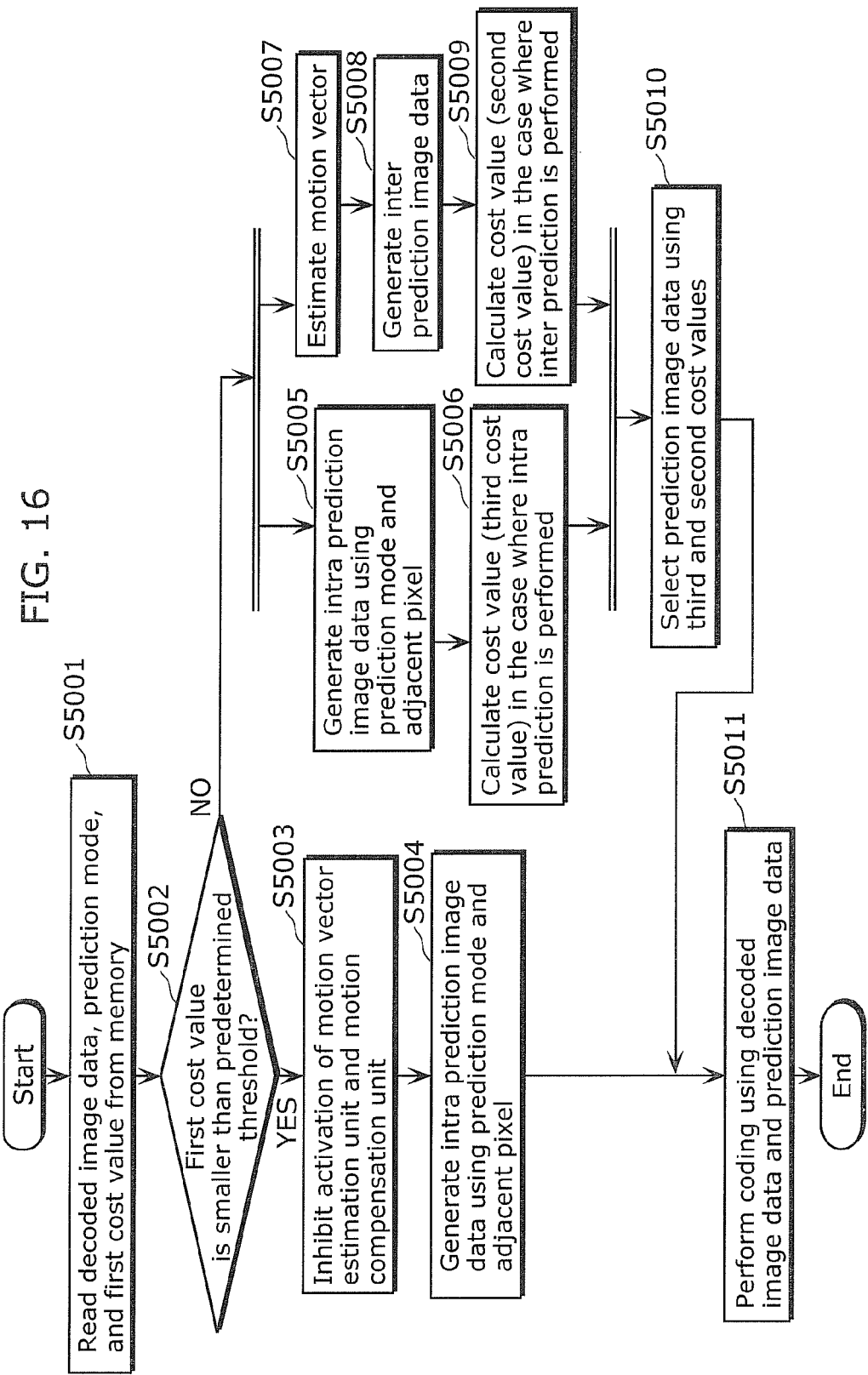
FIG. 16 is a flowchart which shows a specific operation of the coding unit according to Embodiment 3 of the present invention.

FIG. 16 is a flowchart which shows a specific operation of the coding unit 600 according to Embodiment 3 of the present invention. More specifically, FIG. 16 shows an operation of simply selecting intra prediction or inter prediction using the first cost value.

First, the coding unit 600 reads the decoded image data from the memory 102 for each of the MBs, and further reads the prediction mode and the first cost value associated with each other for each sub-block resulted from segmenting the MBs (S5001).

Next, the control unit 502 determines whether or not the first cost value that has been read is smaller than a predetermined threshold (S5002). When the first cost value is smaller than the predetermined threshold (YES in S5002), the control unit 502 controls the prediction method selecting unit 601 so that intra prediction image is selected. When the first cost value is equal to or larger than the predetermined threshold (NO in S5002), the control unit 502 controls the prediction method selecting unit 601 so that inter prediction image is selected. It is to be noted that the predetermined threshold may be a value that is set based on a limitation value according to the H.264/AVC standard, or may be a value that is set based on decoded information generated during the process of decoding processing.

In the case where it is determined that the first cost value is smaller than the predetermined threshold (YES in S5002), the control unit 502 controls the motion vector estimation unit 310 and the motion compensation unit 311 so that the motion vector estimation unit 310 and the motion compensation unit 311 do not carry out processing (S5003). That means that the control unit 502 inhibits activation of the motion vector estimation unit 310 and the motion compensation unit 311.

Next, the intra prediction unit 312 performs intra prediction using the prediction mode read using information on a pixel adjacent to a MB to be processed, from among decoded image data output from the adder 307 to generate intra prediction image data. Then the intra prediction unit 312 outputs the generated intra prediction image data to the prediction method selecting unit 601. The prediction method selecting unit 601 outputs the intra prediction image data to the subtractor 301 and the adder 307.

On the other hand, in the case where it is determined that the first cost value is larger than the predetermined threshold (NO in S5002), the intra prediction unit 312 generates intra prediction image data by performing intra prediction based on the read prediction mode using information on a pixel adjacent to a MB to be coded or a sub-block resulted from segmenting the MB, from among decoded image data output from the adder 307. Then the intra prediction unit 312 outputs the generated intra prediction image data to the third cost value generating unit 313 and the prediction method selecting unit 601.

Then the third cost value generating unit 313 generates the third cost value based on the intra prediction image data and outputs the generated third cost value to the prediction method selecting unit 601 (S5006).

In addition, in parallel with the generating of intra prediction image data (S5005) and the generating of the third cost value, the motion vector estimation unit 310 estimates a motion vector based on the decoded image data stored in the frame memory 309 and outputs the estimated motion vector to the motion compensation unit 311 (S5007).

Next, the motion compensation unit 311 generates a prediction image data that has been motion compensated (inter prediction image data), by performing inter prediction based on the motion vector estimated by the motion vector estimation unit 310 and the decoded image data stored in the frame memory 309. Then the motion compensation unit 311 outputs the generated inter prediction image data to the prediction method selecting unit 601 and the second cost value generating unit 314 (S5008).

Next, the second cost value generating unit 314 generates the second cost value based on the inter prediction image data and outputs the generated second cost value to the prediction method selecting unit 601 (S5009).

Then the prediction method selecting unit 601 selects the prediction image data to be output to the subtractor 301 and the adder 307, based on the third cost value generated by the third cost value generating unit 313 and the second cost value generated by the second cost value generating unit 314, and outputs the selected prediction image data to the subtractor 301 and the adder 307 (S5010).

Next, the subtractor 301 generates residual image data based on the prediction image data and the decoded image data. Then the coding unit 600 performs the rest of coding processing based on the residual image data (S5011). More specifically, the coding unit 600 performs orthogonal transformation, quantization, variable length coding, and generation of a reference image to be used for the next coding processing (inverse quantization, inverse orthogonal transformation, and addition).

As described above, with the transcoder 500 according to the present embodiment, when performing transcoding on coded data to which intra prediction is applied, the first cost value is generated based on the decoded information generated during the decoding process of the decoding unit 200. Then the transcoder 500 uses the generated first cost value in coding, so that the transcoder 500 can simply select a prediction method to be applied to the MB to be coded, without generating prediction image data on which intra prediction performed at the time of coding. With this configuration, it is possible to further reduce the processing amount of the transcoder 100 as a whole.

It is to be noted that, in the transcoder 500 according to the present embodiment, the prediction method selecting unit 601 selects intra prediction image data as prediction image data when the third cost value is smaller than the second cost value in the coding unit 600, even when the first cost value is larger than the threshold.

With this, the transcoder 500 according to the present embodiment produces an advantageous effect of reducing a processing amount when the first cost value is smaller than a threshold. Further, the transcoder 500 according to the present embodiment produces an advantageous effect that it is possible to generate prediction image data with a high degree of precision by further comparing the second cost value and the third cost value in the case where the first cost value is larger than the threshold, and thus coding efficiency can be increased.

Figure 17:
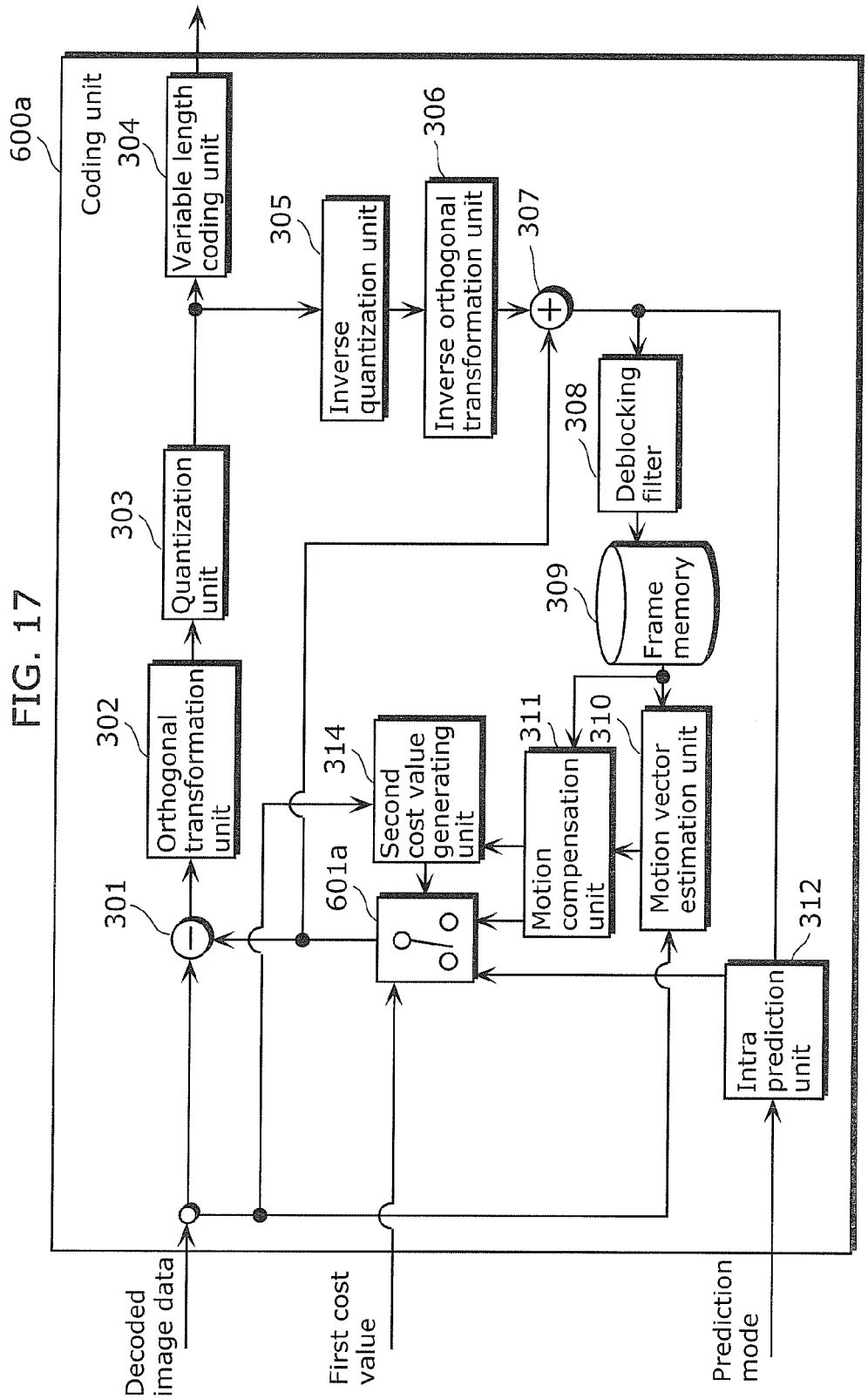
FIG. 17 is a block diagram which shows a configuration of a modification example of the decoding unit according to Embodiment 3 of the present invention.

It is to be noted that, with the transcoder 500 according to the present embodiment, it is not necessary to generate the third cost value that indicates coding efficiency in the case where intra prediction is performed, as in the coding unit 600a shown in FIG. 17.

The coding unit 600a shown in FIG. 17 is different from the coding unit 600 shown in FIG. 15 in that the third cost value generating unit 313 is not included and a prediction method selecting unit 601a is included instead of the prediction method selecting unit 601.

The prediction method selecting unit 601a compares the first cost value read from the memory 102 and a predetermined threshold, and selects intra prediction image data generated by the intra prediction unit 312 in the case where the first cost value is smaller than the predetermined threshold. At this time, it is possible to reduce the processing amount of the coding unit 600a by inhibiting activation of the motion vector estimation unit 310 and the motion compensation unit 311 by the control unit 502.

Further, the prediction method selecting unit 601a compares the first cost value and the second cost value generating unit 314 in the case where the first cost value is equal to or larger than the predetermined threshold, and selects intra prediction image data or inter prediction image data generated by the motion compensation unit 311, based on a result of the comparison. More specifically, the prediction method selecting unit 601a selects the intra prediction image data in the case where the first cost value is smaller than the second cost value, and outputs the intra prediction image data to the subtractor 301 and the adder 307. Furthermore, the prediction method selecting unit 601a selects the inter prediction image data in the case where the first cost value is equal to or larger than the second cost value, and outputs the inter prediction image data to the subtractor 301 and the adder 307.

With the configuration described above, according to the modification example of the transcoder 500 according to the present embodiment, it is possible to reduce processing for generating the third cost value, and thus the processing amount of the coding unit 600 can be reduced.

(Embodiment 4)

The transcoders 100 and 500 according to embodiments described above are directed to reduce the processing amount of the transcoder as a whole by omitting intra prediction processing at the time of coding, using decoded information generated during the decoding process. In Embodiment 4, a coding parameter is further generated based on the first cost value generated at the time of decoding in order to increase efficiency of coding processing in transcoding processing.

It is to be noted that the coding parameter is a parameter that is set at the time of coding, and includes, for example, a search range of motion estimation which is set for performing motion compensation, and the number of reference images which is referred to when performing inter prediction.

The following describes a transcoder according to Embodiment 4 of the present invention with reference drawings. It is to be noted that, in Embodiment 4, the same numerals are assigned to the same portions as in Embodiment 1 to Embodiment 3 and the description for the portions is omitted.

Figure 18:
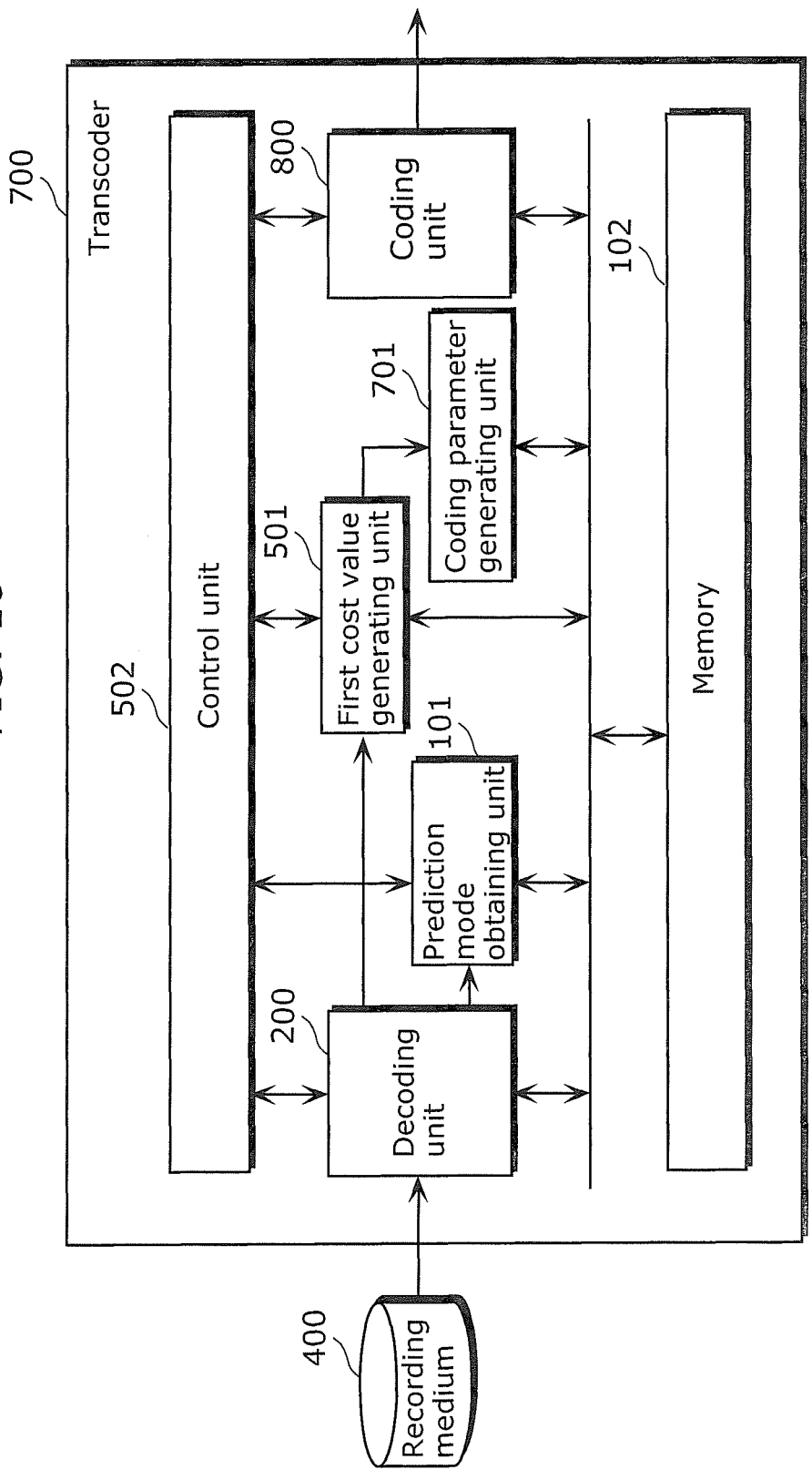
FIG. 18 is a block diagram which shows a configuration of a transcoder according to Embodiment 4 of the present invention.

FIG. 18 is a schematic view which explains an outline of a transcoder 700 according to Embodiment 4 of the present invention. The transcoder 700 shown in FIG. 18 is different from the transcoder 500 according to Embodiments 3 in that a coding parameter generating unit 701 is included and a coding unit 800 is included instead of the coding unit 600.

The coding parameter generating unit 701 generates a coding parameter that is used when the coding unit 800 performs coding, based on the first cost value generated by the first cost value generating unit 501, and outputs the generated coding parameter to the memory 102. It is to be noted that the control unit 502 records the sub-block number, the prediction mode, and the coding parameter in association with each other at the time of outputting to the memory 102.

Here, a specific operation of the coding parameter generating unit 701 is described.

The coding parameter generating unit 701 determines, for each MB, whether or not the first cost value output from the first cost value generating unit 501 is smaller than a predetermined threshold. At this time, a counter value of a counter included in the coding parameter generating unit 701 is incremented in the case where the first cost value is smaller than the predetermined threshold. More specifically, the coding parameter generating unit 701 uses the counter to count the number of MB having the first cost value determined as being smaller than the predetermined threshold. Then the coding parameter generating unit 701 sets a coding parameter based on a result of the counting.

At the stage where the determination of the first cost value and the incrementing of counter value as described above are completed for one frame, a coding parameter that is applied when coding the frame is generated based on the counter value. For example, the processing amount when the frame is coded is determined as being small in the case where the counter value is over a majority of all of the MBs included in one frame.

Accordingly, the coding parameter generating unit 701 generates a parameter that indicates a search range of motion estimation which is larger than usual. Further, the coding parameter generating unit 701 generates a parameter that indicates the larger than usual number of reference images set at the time of performing inter prediction when coding. Then the coding parameter generating unit 701 outputs, as a coding parameter, the generated parameter that indicates a search range of motion estimation and the parameter related to the number of reference images to the memory 102.

It is to be noted that whether or not the first cost value is smaller than a predetermined threshold is determined in Embodiment 4, conversely, however, whether or not the first cost value is larger than a predetermined threshold may be determined. Then, when the coding parameter generating unit 701 determines that the first cost value is larger than the predetermined threshold, the coding parameter generating unit 701 generates a parameter that indicates a smaller than usual search range of motion estimation and a parameter that indicates the larger than usual number of reference images. In addition, it is preferable that the threshold used for determining that the processing amount at the time of coding a frame is small is a value that can be modified according to designer's intention.

In addition, the search range may be modified linearly according to a counter value. More specifically, a relation between the counter value and the search range may be set as in Expressions 1, 2, and 3. It is to be noted that "a" is a constant number.

(Expression 1) (search range)=clip (MIN, MAX, a×(counter value)) (Expression 2) when a×(counter value) <MIN, (search range)=MIN (Expression 3) when a×(counter value)>MAX, (search range)=MAX The coding unit 800 generates prediction image data by applying intra prediction or inter prediction to the decoded image data generated by the decoding unit 200, based on the first cost value, the prediction mode, and the coding parameter which are recorded on the memory 102, and calculate a difference between the generated prediction image data and the decoded image data. Then the coding unit 800 performs orthogonal transformation, quantization, and variable length coding on the calculated difference data to generate a stream B including coded image data and coded information that includes a motion vector and so on.

As described above, according to Embodiment 4, when transcoding coded data to which intra prediction is applied, the first cost value is generated based on decoded information generated during decoding processing, the coding parameter that is set when coding is generated using the first cost value, and the generated coding parameter is used at the time of coding. With this configuration, it is possible to use, at the time of coding, the coding parameter generated based on the first cost value generated for each of the MBs in one frame, and thus coding efficiency can be increased.

The transcoder and a method of transcoding according to the present invention are described based on the embodiments above, however, the present invention is not limited to the embodiments. Other forms in which various modifications apparent to those skilled in the art are applied to the embodiments, or forms structured by combining elements of different embodiments are included within the scope of the present invention, unless such changes and modifications depart from the scope of the present invention.

It is to be noted that the stream A is a coded stream that is coded using only an intra frame according to the present invention, however, the stream A is not limited to this, but may be a coded stream to at least part of which intra prediction is applied. More specifically, the transcoder according to the present invention may convert the stream A to at least part of which intra prediction is applied, to a stream B to which intra prediction and inter prediction are applied.

In this case, the transcoder according to the present invention obtains, when decoding the stream A, a prediction mode of a block to which intra prediction is applied, and uses the obtained prediction mode in the coding unit. More specifically, the coding unit, when a prediction mode of a block to be coded is obtained, performs coding using a prediction mode stored in the memory.

Furthermore, the decoding unit includes a motion vector estimation unit and a motion compensation unit for decoding inter prediction image data. It is to be noted that, with the above configuration, it is possible to reduce the processing amount of the transcoder as a whole even in the case where transcoding is performed by changing a coding condition from H.264/AVC to H.264/AVC, for example.

It is to be noted that, the present invention can be applied to any audio-visual equipments as long as the equipments can record a coded stream, such as a camera or a digital recorder capable of generating a coded stream using intra prediction.

In addition, the present invention may be realized not only as a transcoder and method of transcoding, but also as a program which causes a computer to execute the method of transcoding according to the embodiments of the present invention. Furthermore, the present invention may also be realized as a computer-readable recording medium such as a CD-ROM, on which the program can be recorded. Furthermore, the present invention may also be realized as information, data, or a signal indicating the program. Further, the program, the information, the data and the signal may be distributed via a communication network such as the Internet.

Furthermore, a part or all of the constituent elements constituting the transcoder may be configured from a single System-LSI (Large-Scale Integration) according to the present invention. The system LSI is a super-multi-function LSI manufactured by integrating constituent units on one chip, and is specifically a computer system configured by including a microprocessor, a ROM, a RAM, and so on.

The present invention produces an advantageous effect that the processing for recoding can be reduced when transcoding a coded stream to which at least intra prediction is applied, to a coded stream to which intra prediction and inter prediction are applied, and can be applied to audio-visual equipments such as a digital camera, a digital recorder/player, and so on.

Reference Signs List

100, 500, 700 transcoder
101 prediction mode obtaining unit
102 memory
103, 502 control unit
200 decoding unit
201 variable length decoding unit
202, 305 inverse quantization unit
203, 306 inverse orthogonal transformation unit
204, 307 adder
205, 308 deblocking filter
206, 312 intra prediction unit
300, 600, 600a, 800 coding unit
301, subtractor
302 orthogonal transformation unit
303, quantization unit
304 variable length coding unit
309 frame memory
310 motion vector estimation unit
311 motion compensation unit
313 third cost value generating unit
314 second cost value generating unit
315, 601, 601a prediction method selecting unit
320, inter prediction unit
400 recording medium
501 first cost value generating unit
701 coding parameter generating unit

The invention claimed is:

1. A transcoder which converts a first coded stream to at least part of which intra prediction is applied, into a second coded stream to which intra prediction and inter prediction are applied, the transcoder comprising:
    a decoding unit configured to decode the first coded stream on a per predetermined unit basis to generate decoded image data;
    an intra prediction direction obtaining unit configured to obtain an intra prediction direction on a per processing unit basis, the intra prediction direction being one of intra prediction directions (i) specified in a coding standard used in the coding of the first coded stream and (ii) actually applied to the first coded stream, the processing unit being a processing unit of the intra prediction in coding of the first coded stream;

a coding unit configured to code the decoded image data by applying intra prediction or inter prediction on a per prediction processing unit basis to generate the second coded stream; and a control unit configured to control the coding unit so that the coding unit reuses the intra prediction direction obtained by the intra prediction direction obtaining unit in the decoding of the first coded stream performed by the decoding unit, when the coding unit performs the prediction processing using the intra prediction; and a first cost value generating unit configured to generate a first cost value on the per predetermined unit basis based on decoded information generated in a decoding process performed by the decoding unit and before intra prediction or inter prediction is applied, the first cost value indicating coding efficiency when intra prediction is to be applied, wherein the control unit is further configured to control the coding unit so that the coding unit applies intra prediction or inter prediction according to the first cost value on the per predetermined unit basis when coding the decoded image data.

2. The transcoder according to claim 1, wherein the first cost value generating unit is configured to generate the first cost value that is smaller as the coding efficiency when intra prediction is applied is higher, and the control unit is configured to control the coding unit so that the coding unit applies intra prediction when the first cost value is smaller than a first threshold.

3. The transcoder according to claim 2, wherein the coding unit includes:

an inter prediction unit configured to generate inter prediction image data by applying inter prediction to the decoded image data on the per predetermined unit basis;

a second cost value generating unit configured to generate a second cost value on the per predetermined unit basis based on the inter prediction image data, the second cost value indicating coding efficiency when inter prediction is applied;

an intra prediction unit configured to generate intra prediction image data by applying using the intra prediction direction, intra prediction on the per predetermined unit basis; and a third cost value generating unit configured to generate a third cost value on the per predetermined unit basis based on the intra prediction image data, the third cost value indicating coding efficiency when intra prediction is applied, and the control unit is configured to control, when the first cost value is equal to or larger than the first threshold, the coding unit so that the coding unit compares the second cost value and the third cost value and applies intra prediction or inter prediction based on a result of the comparing.

4. The transcoder according to claim 3, wherein the control unit is configured to control the coding unit so that the coding unit generates the second cost value after determining that the first cost value is equal to or larger than the first threshold and compares the second cost value and the third cost value.

5. The transcoder according to claim 3, wherein the control unit is configured to control the coding unit so that the coding unit compares the second cost value and the third cost value and applies intra prediction when the coding efficiency indicated by the third cost value is higher than the coding efficiency indicated by the second cost value.

6. The transcoder according to claim 1, further comprising a coding parameter generating unit configured to generate a coding parameter based on the first cost value, the coding parameter used for setting at least one of a search range of motion estimation and the number of reference images.

7. The transcoder according to claim 6, wherein the coding parameter generating unit is configured to count a result of comparing the first cost value and the first threshold and to generate the coding parameter according to a result of the counting.

8. The transcoder according to claim 1, wherein the coding unit includes:

an intra prediction unit configured to generate intra prediction image data by applying using the intra prediction direction, intra prediction on the per predetermined unit basis;

a third cost value generating unit configured to generate a third cost value on the per predetermined unit basis based on the intra prediction image data, the third cost value being smaller as coding efficiency when intra prediction is applied is higher;

an inter prediction unit configured to generate inter prediction image data by applying inter prediction to the decoded image data on the per predetermined unit basis; and a second cost value generating unit configured to generate a second cost value on the per predetermined unit basis based on the inter prediction image data, the second cost value indicating coding efficiency when inter prediction is applied, and the control unit is configured to control the coding unit so that the coding unit generates the inter prediction image data and the second cost value after determining that the third cost value is equal to or larger than a second threshold.

9. A method of transcoding for converting a first coded stream to at least part of which intra prediction is applied, into a second coded stream to which intra prediction and inter prediction are applied, the method comprising:

decoding the first coded stream on a per predetermined unit basis to generate decoded image data;

obtaining an intra prediction direction on a per processing unit basis, the intra prediction direction being one of intra prediction directions (i) specified in a coding standard used in the coding of the first coded stream and (ii) actually applied to the first coded stream, the processing unit being a processing unit of the intra prediction in coding of the first coded stream;

coding the decoded image data by applying intra prediction or inter prediction on a per prediction processing unit basis to generate the second coded stream; and controlling reuse of the intra prediction direction obtained by the intra prediction direction obtaining step in the decoding of the first coded stream performed by the decoding step, when the coding step performs the prediction processing using the intra prediction;

a first cost value generating step of generating a first cost value on the per predetermined unit basis based on decoded information generated in a decoding process performed and before intra prediction or inter prediction is applied, the first cost value indicating coding efficiency when intra prediction is to be applied, wherein the controlling step applies intra prediction or inter prediction according to the first cost value on the per predetermined unit basis when coding the decoded image data.

* * * * *